July 10, 1962    E. E. REYNOLDS ETAL    3,043,502
DECIMAL POINT INDICATOR MEANS
Filed Aug. 23, 1957    22 Sheets-Sheet 3
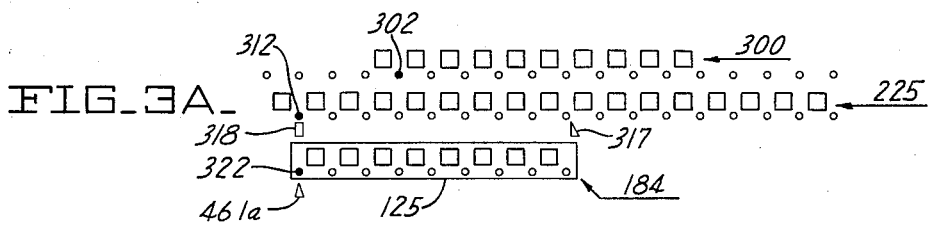
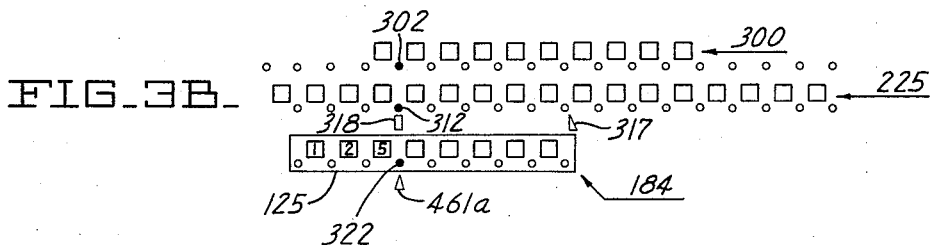
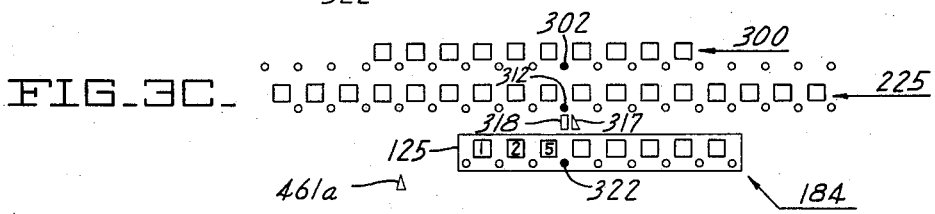
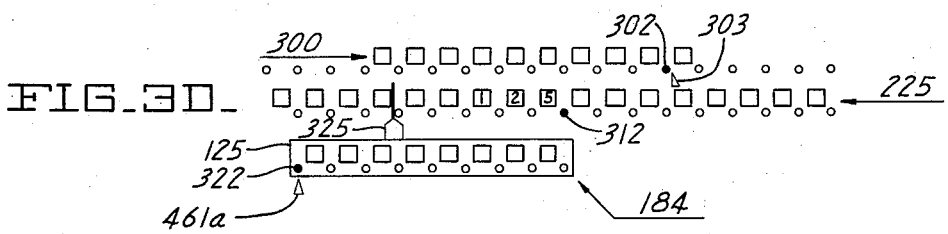
INVENTORS.
Eugene E. Reynolds.
William E. Thomas
BY Clarence W. Martin
AGENT.

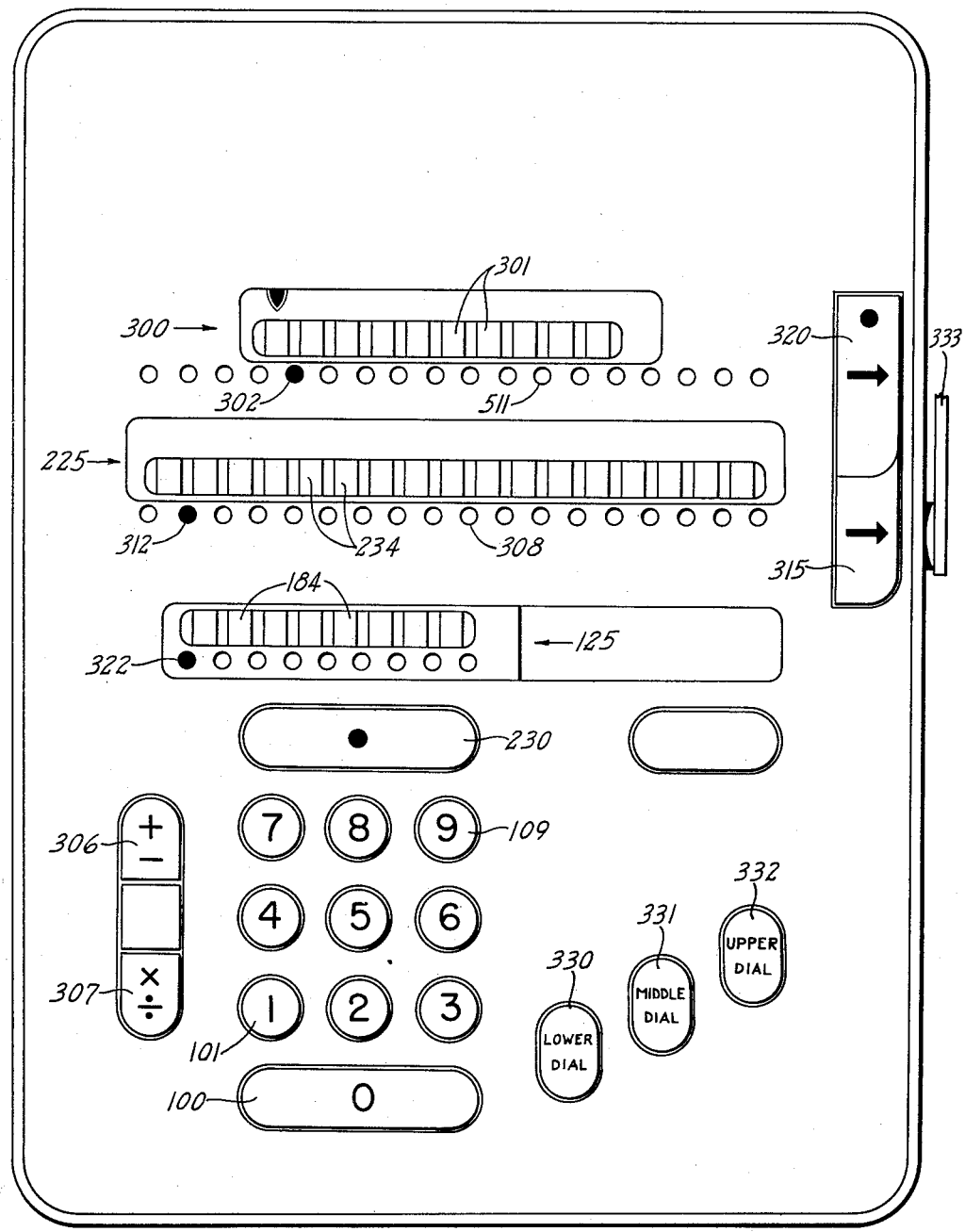
FIG_1_

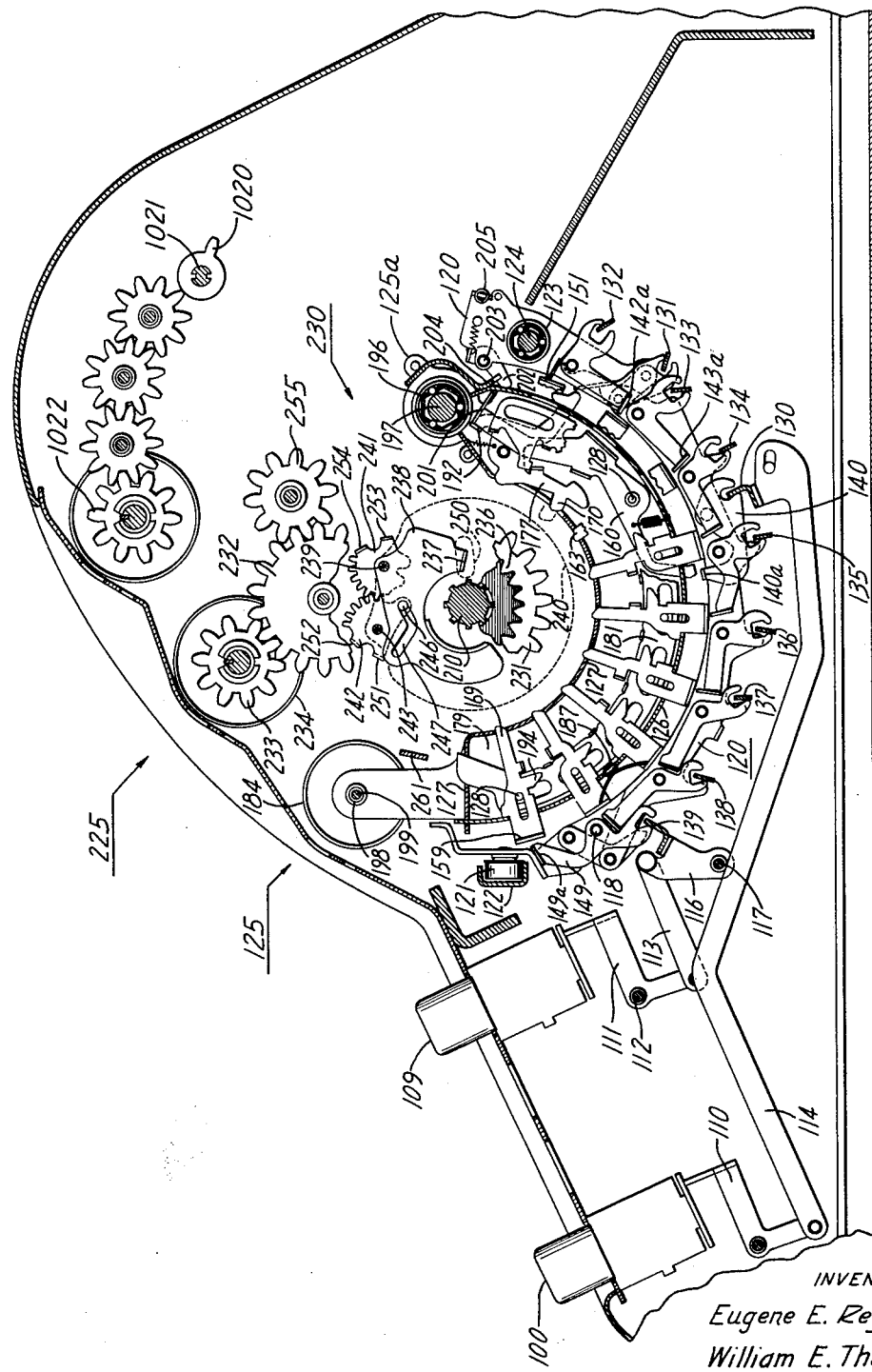

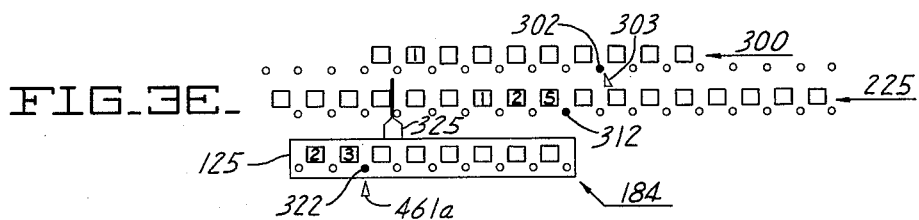
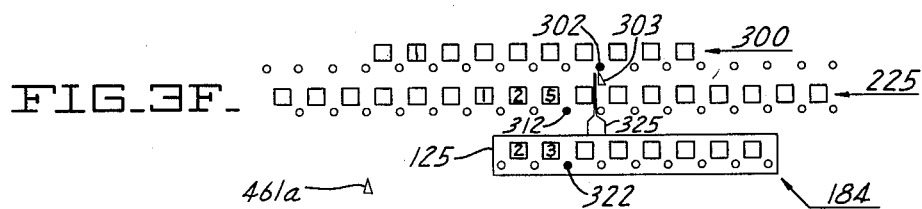
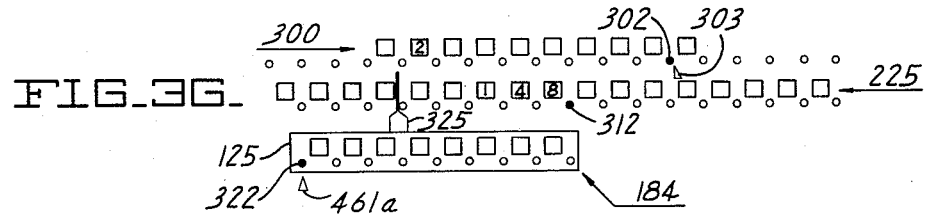

July 10, 1962 E. E. REYNOLDS ETAL 3,043,502
DECIMAL POINT INDICATOR MEANS
Filed Aug. 23, 1957 22 Sheets-Sheet 5
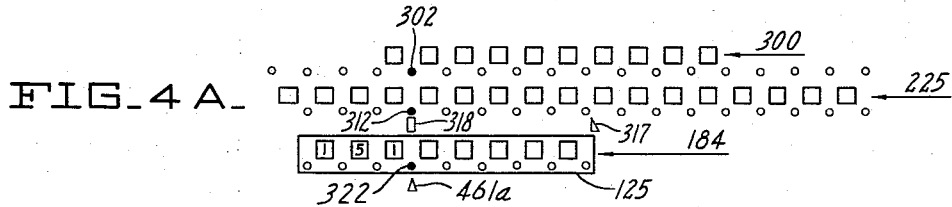
FIG_4A_
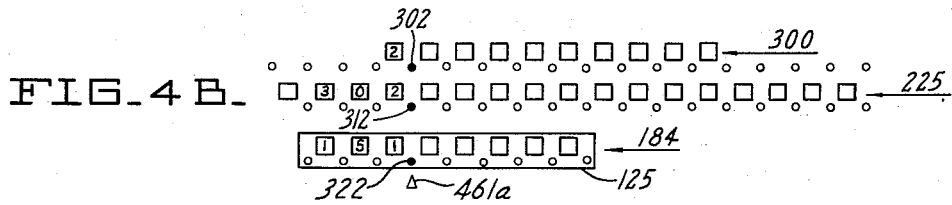
FIG_4B_
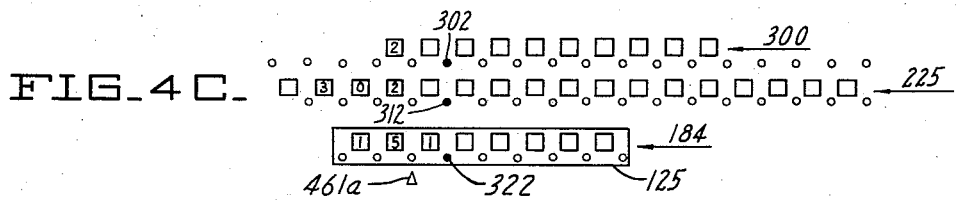
FIG_4C_
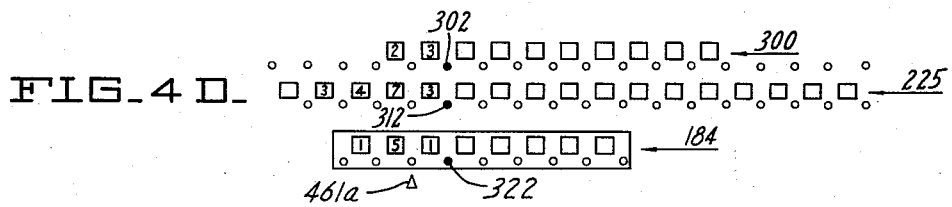
FIG_4D_
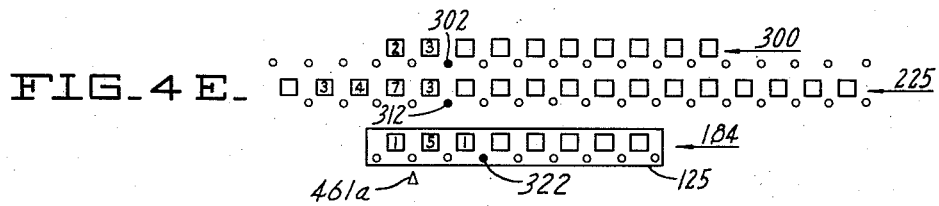
FIG_4E_
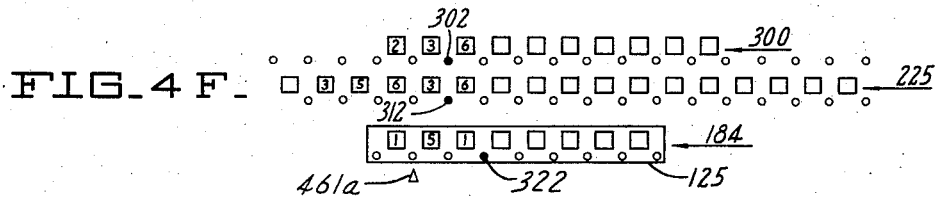
FIG_4F_
*INVENTORS.*
*Eugene E. Reynolds.*
*William E. Thomas.*
BY
AGENT.

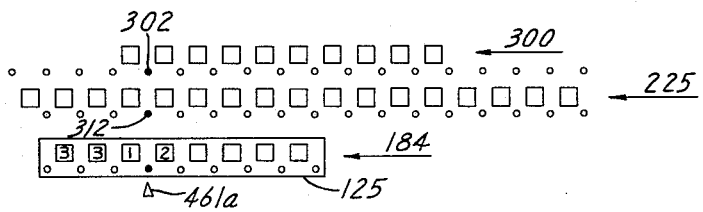
FIG_5A_
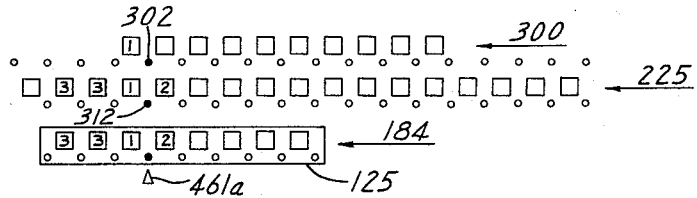
FIG_5B_
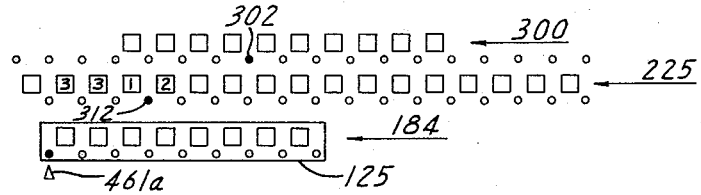
FIG_5C_
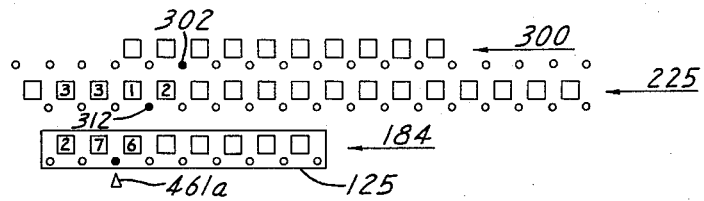
FIG_5D_
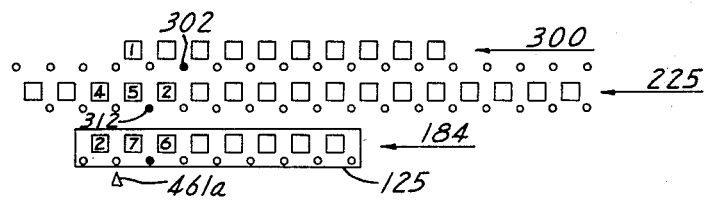
FIG_5E_
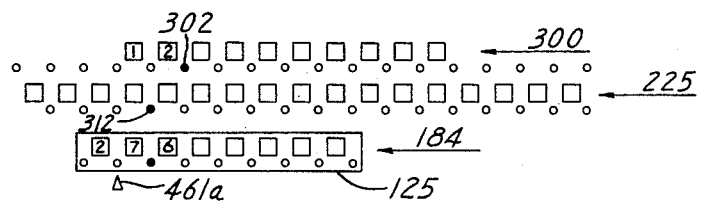
FIG_5F_
INVENTORS
Eugene E. Reynolds.
William E. Thomas.
BY Clarence W. Martin
AGENT.

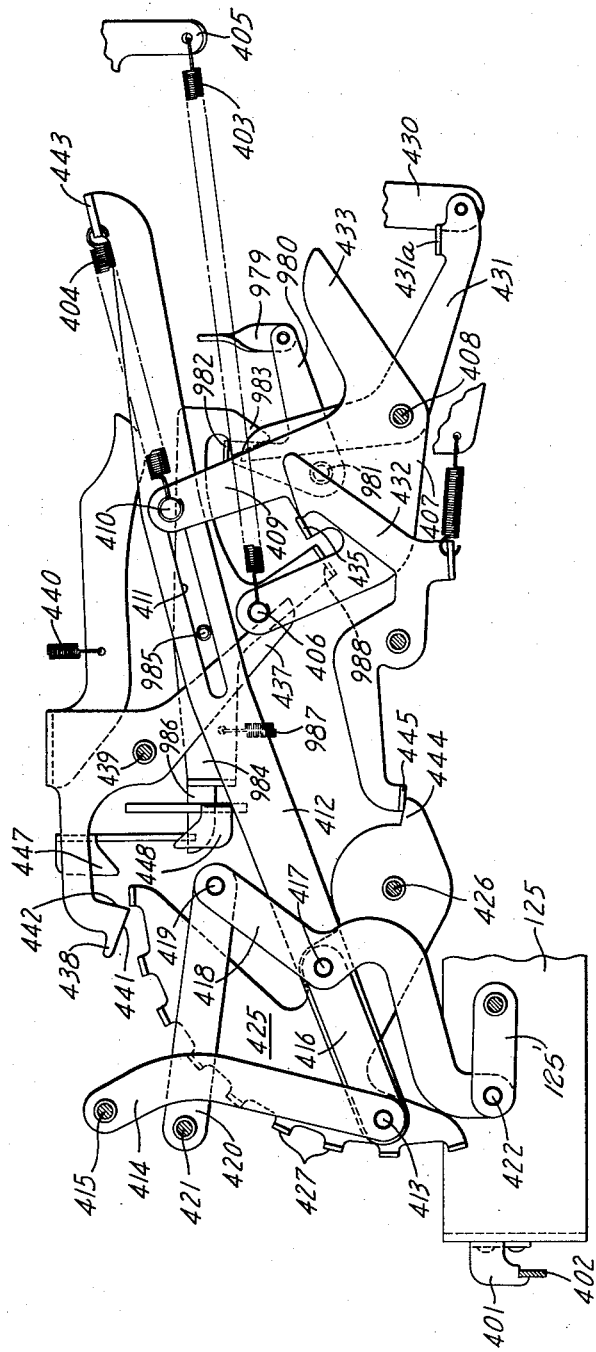

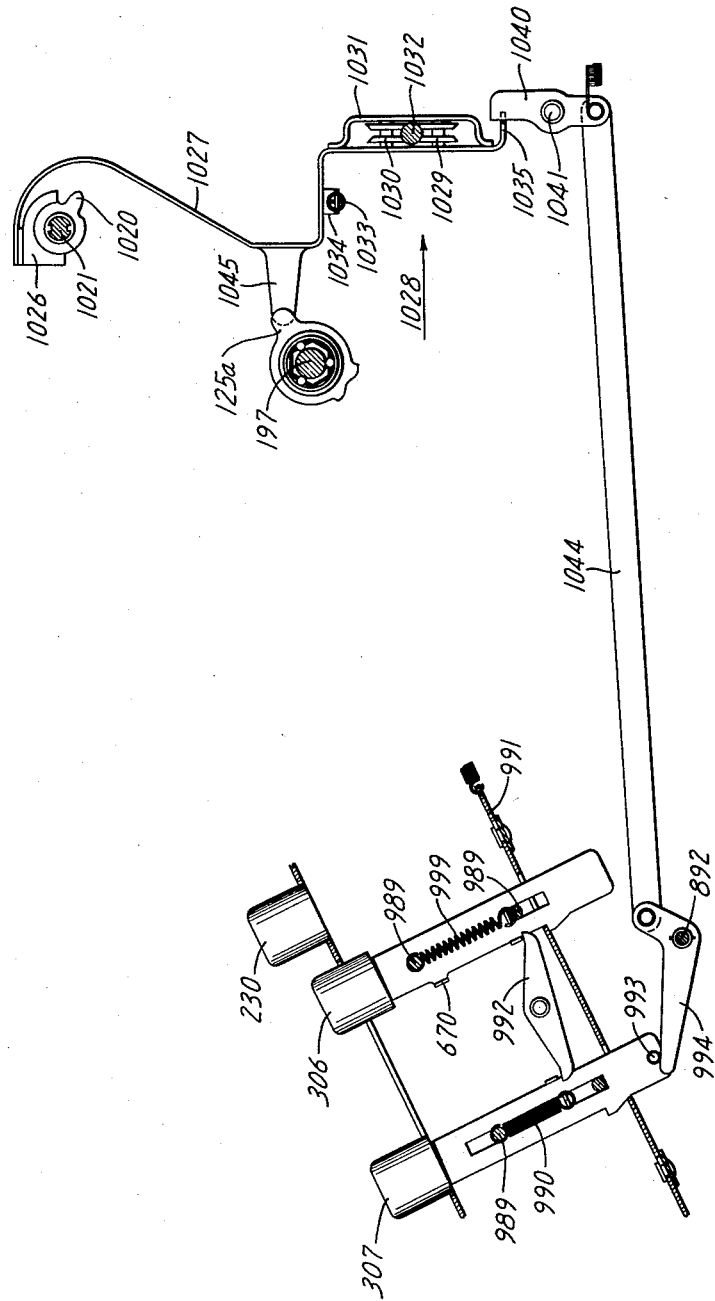

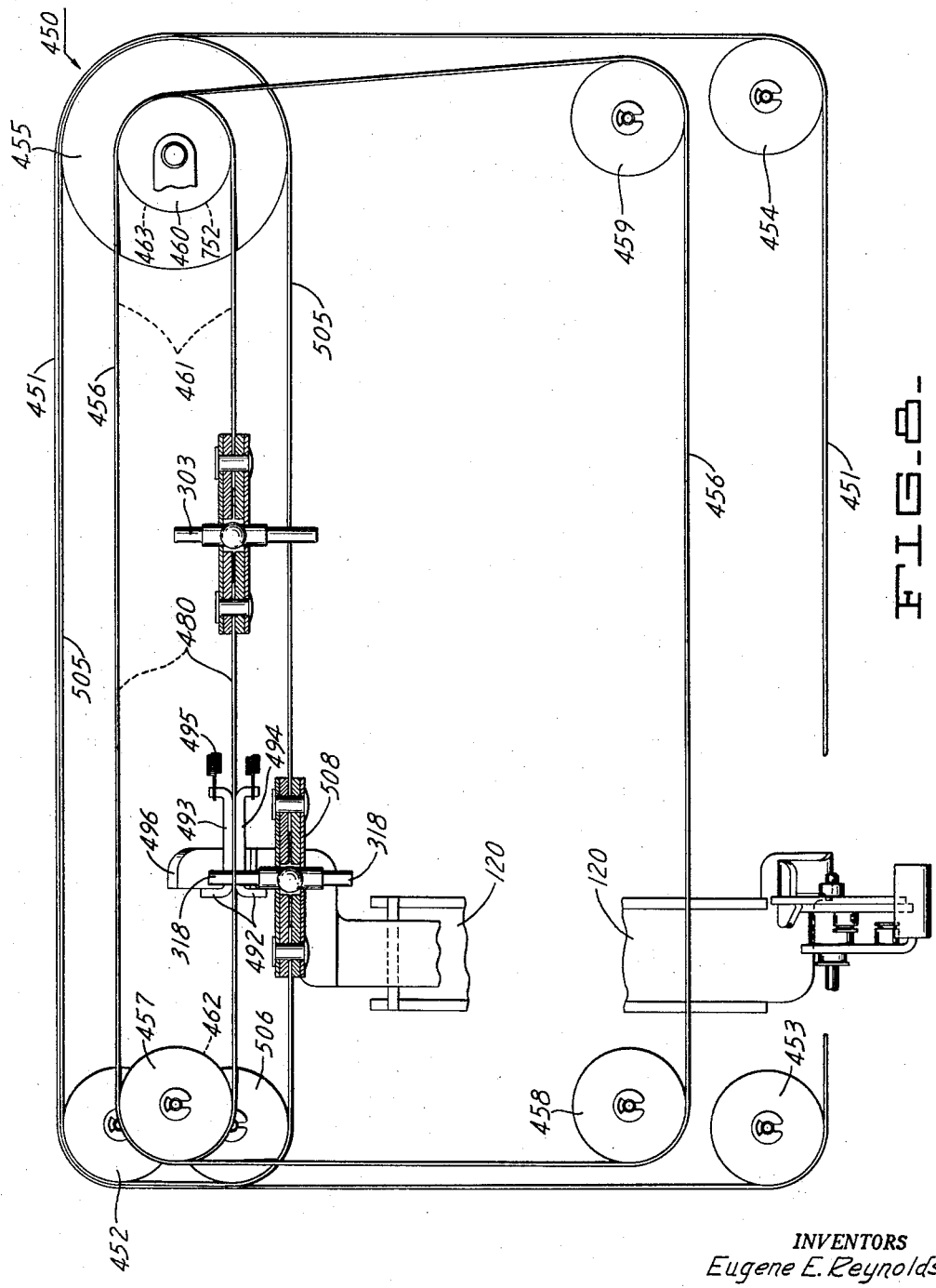

July 10, 1962 E. E. REYNOLDS ETAL 3,043,502
DECIMAL POINT INDICATOR MEANS
Filed Aug. 23, 1957 22 Sheets-Sheet 10

INVENTORS
Eugene E. Reynolds.
William E. Thomas.
BY Clarence W. Martin
AGENT.

July 10, 1962

E. E. REYNOLDS ETAL 3,043,502

DECIMAL POINT INDICATOR MEANS

Filed Aug. 23, 1957

INVENTORS
Eugene E. Reynolds.
William E. Thomas
BY
AGENT.

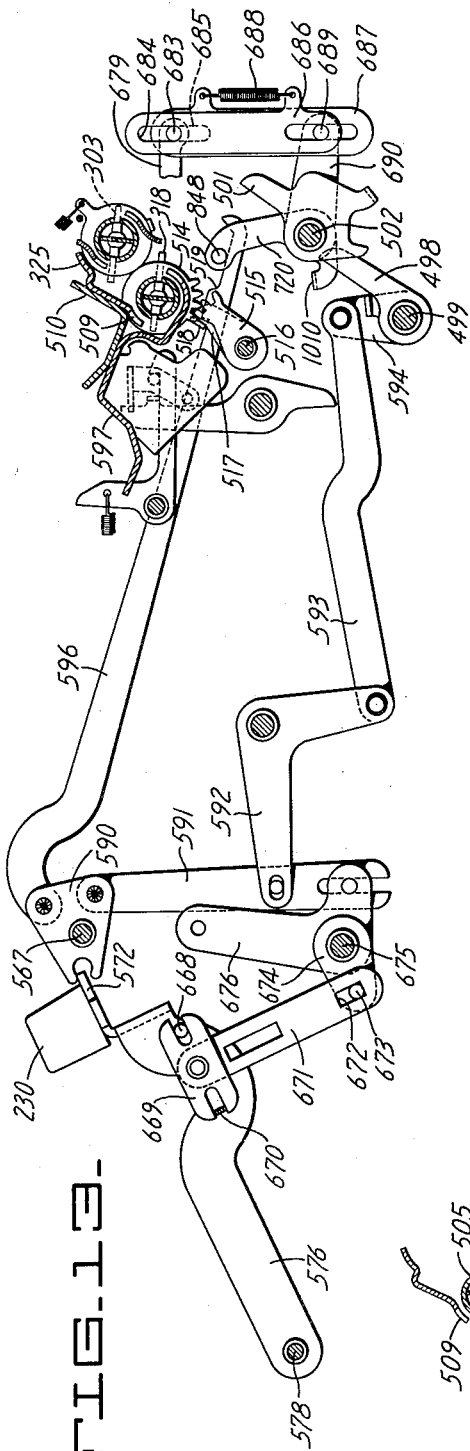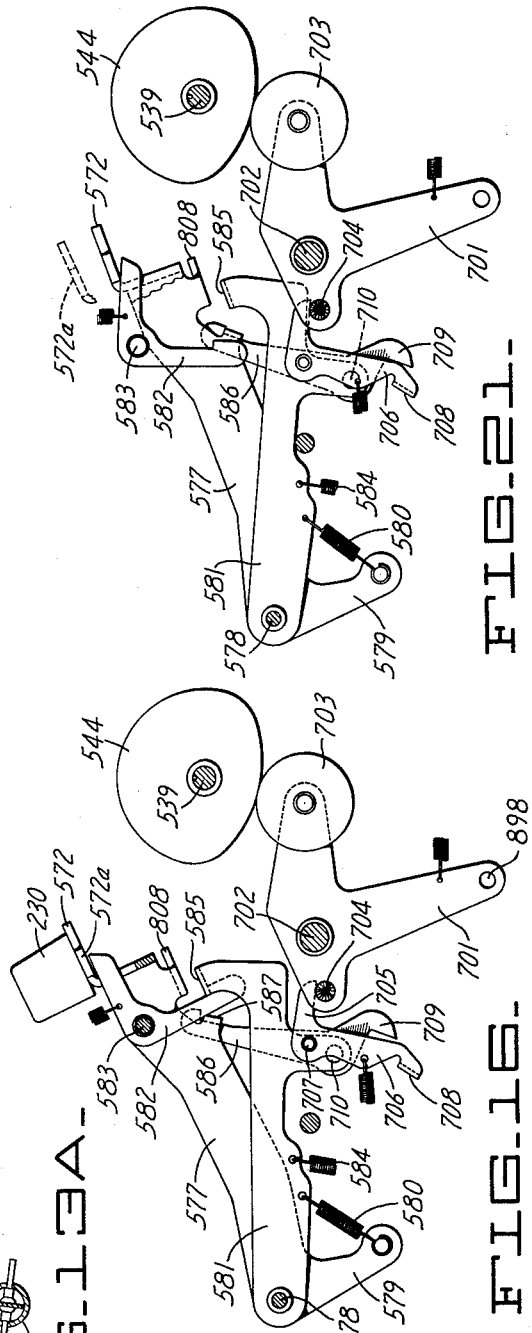

July 10, 1962
E. E. REYNOLDS ETAL
3,043,502
DECIMAL POINT INDICATOR MEANS
Filed Aug. 23, 1957
22 Sheets-Sheet 13
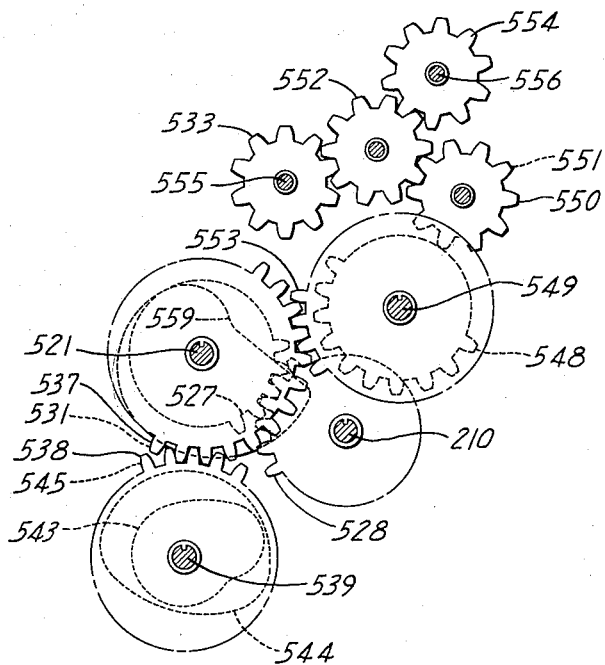
FIG_14_
INVENTORS
Eugene E. Reynolds.
William E. Thomas
BY
AGENT.

July 10, 1962 E. E. REYNOLDS ETAL 3,043,502
DECIMAL POINT INDICATOR MEANS
Filed Aug. 23, 1957 22 Sheets-Sheet 14
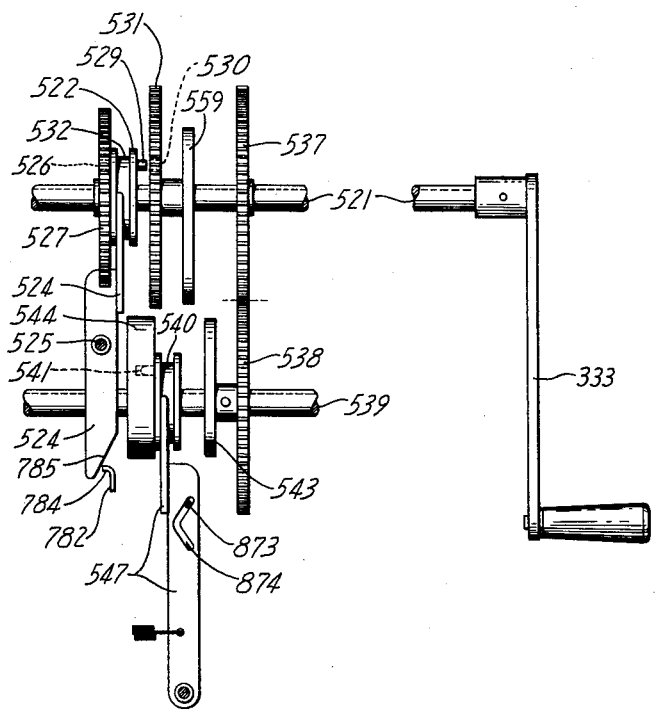
FIG_15_
INVENTORS
Eugene E. Reynolds.
William E. Thomas.
BY
AGENT.

July 10, 1962  E. E. REYNOLDS ETAL  3,043,502
DECIMAL POINT INDICATOR MEANS
Filed Aug. 23, 1957  22 Sheets-Sheet 15

INVENTORS
Eugene E. Reynolds.
William E. Thomas.
BY Clarence W. Martin
AGENT.

INVENTORS.
Eugene E. Reynolds.
William E. Thomas.
BY
AGENT.

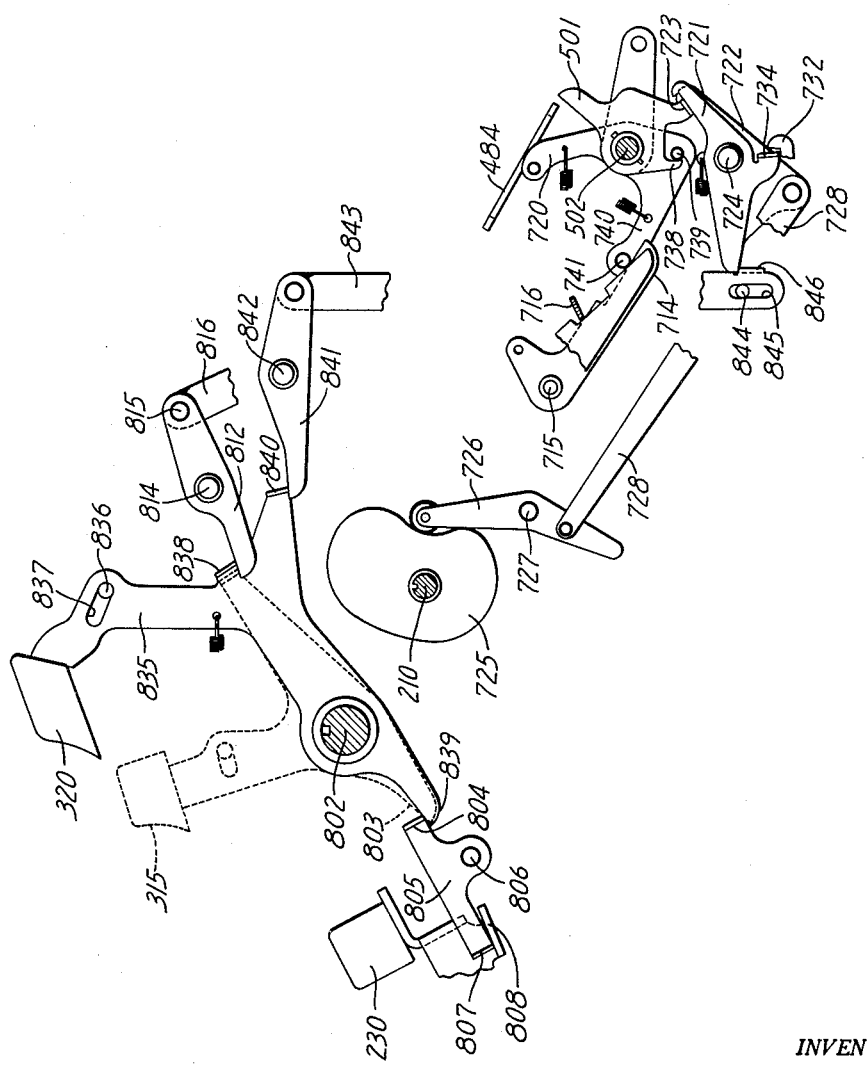

July 10, 1962     E. E. REYNOLDS ETAL     3,043,502
DECIMAL POINT INDICATOR MEANS
Filed Aug. 23, 1957     22 Sheets-Sheet 21

INVENTORS
Eugene E. Reynolds.
William E. Thomas.
BY Clarence W. Martin
AGENT.

INVENTORS
Eugene E. Reynolds.
William E. Thomas.
BY
AGENT.

United States Patent Office 3,043,502
Patented July 10, 1962

3,043,502
DECIMAL POINT INDICATOR MEANS
Eugene E. Reynolds, Richmond Annex, and William E. Thomas, San Francisco, Calif., assignors to Smith-Corona Marchant Inc., a corporation of New York
Filed Aug. 23, 1957, Ser. No. 679,909
26 Claims. (Cl. 235—61)

The invention relates to calculating machines and more particularly concerns decimal indicators for the result registers of such machines.

Decimal indicators which are automatic or semi-automatic in nature of operation have previously been disclosed in the Avery Patent No. 2,467,419, issued April 19, 1949, and also in the Dustin Patent No. 2,702,668, issued February 22, 1955.

According to the Avery patent a decimal indicator is provided for the product or accumulator register, which indicator normally stands in a leftmost position relative to the register, and is stepped from left to right one order for each value entered into the numeral wheel actuating mechanism. During problems of addition and subtraction, the position of the decimal indicator is established by the number of integral digits which are entered before the decimal point in the first factor. Thus, in entering the first factor, care must be taken that the decimal point is set in such position of the accumulator register as to permit the entry of all successive factors. For example, if the first factor is a value of 25.0 and a greater value, say 1,241.9 is to be subsequently entered, then in entering the first value, two zeros must be "pumped in" in front of the value 25.0, which will then read "0025.0." This moves the decimal point far enough to the right to permit the entry of a subsequent value having four whole digits.

The Dustin patent discloses means for eliminating such pumping in of zeros by entering successive addends or subtrahends around a fixed decimal in the accumulator register. However, there are inherent disadvantages in using this same fixed decimal for entry of the factors in problems of multiplication, since the entry of integral and fractional multiplier digits requires shifting of the numeral wheel actuators both to the right and to the left from the fixed decimal point.

A machine according to the invention includes mechanisms which permit the use of a fixed decimal in problems of addition or subtraction, and a moving decimal in problems of multiplication and division, thus allowing the operator to perform any of the four types of calculation in a straight forward manner; e.g., no inspection of the values is required before entering a value in addition or subtraction, and no backspacing is required in multiplication and division.

It is therefore an object of the invention to provide an improved decimal indicating mechanism for a calculating machine.

Another object is to provide a unitary decimal indicator for an accumulator register, the position of the indicator being pre-determined during the display of sums and differences, and which indicator is movable relative to the register during the generation of a product.

Another object is to employ a single differential gear unit for determining the movements of a pair of decimal indicators relative to an accumulator register and a counter register, respectively.

Still another object is to shift an accumulator decimal point with the numeral wheel actuating mechanism relative to the accumulator register and then to lock the decimal point relative to the register during subsequent shifting operations of the actuating mechanism.

Still another object is to align a first factor in the accumulator register in correct relationship and under control of a fixed accumulator decimal indicator, and thereafter to align successive factors in correct decimal relationship to the decimal indicator under the control of an auxiliary stop which is automatically adjusted under the control of the value selection mechanism.

Still another object is to automatically disconnect the auxiliary stop from a shifting counter register decimal indicator when the stop has reached a pre-determined limit of ordinal shifting movement, and during return shifting movement of the counter decimal indicator to automatically reconnect the auxiliary stop to the counter decimal indicator in the same ordinal relationship as previously established.

A further object is to fix the location of a decimal indicator relative to the quotient register automatically under the control of the entry of the dividend and divisor values.

Another object is to return the accumulator and counter register decimal indicators to respective initial positions whenever the accumulator register is reset to zero.

An embodiment of the invention which is shown by way of illustration only will be apparent from the following detailed description in which:

FIG. 1 is a top view of a calculating machine in which the present invention is embodied.

FIG. 2 is a right side view, in section, showing a portion of the value entry mechanism, a numeral wheel clutch and the accumulator register.

FIGS. 3A–3G are schematic illustrations of the manner in which the factor storing carriage and the decimal indicators are shifted during a problem of addition.

FIGS. 4A–4F schematically illustrate a multiplying operation.

FIGS. 5A–5F schematically illustrate a division operation.

FIG. 6 is a top view of the shift and restore mechanisms for the storing carriage.

FIG. 7 is right side view of a control mechanism associated with the counter numeral wheel actuator.

FIG. 8 is a top view of the upper and middle dial decimal tapes and associated control mechanisms.

Figure 9:
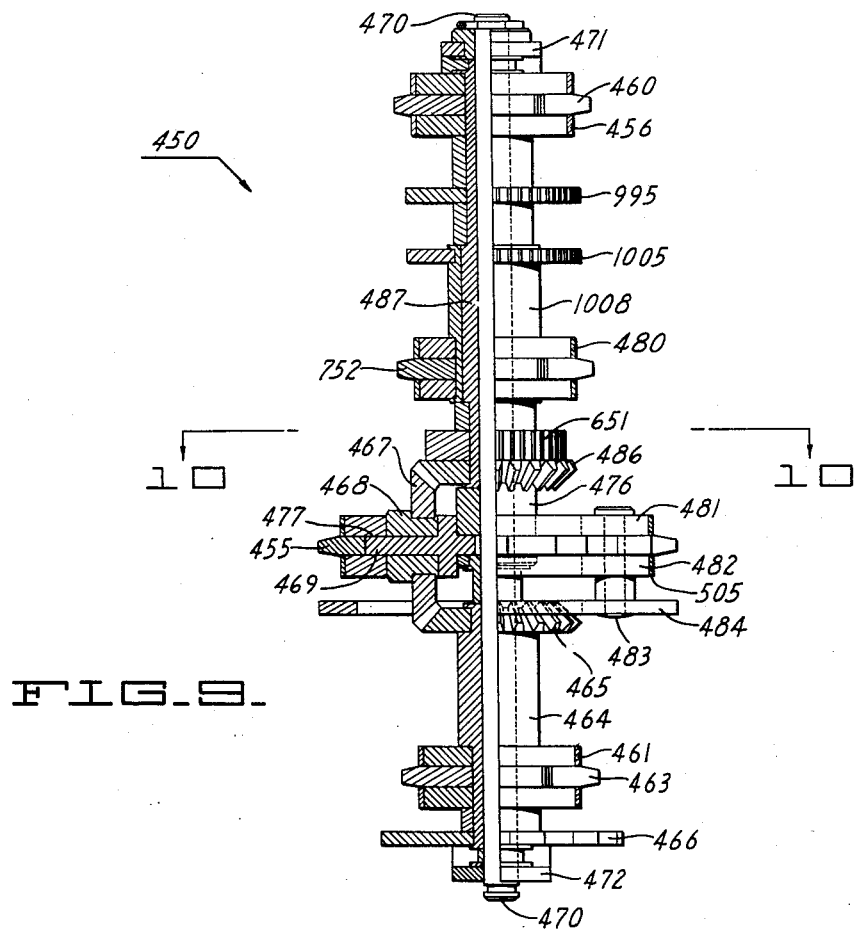

FIG. 9 is a right side view, partially in section, of the decimal tape differential mechanism.

Figure 10:
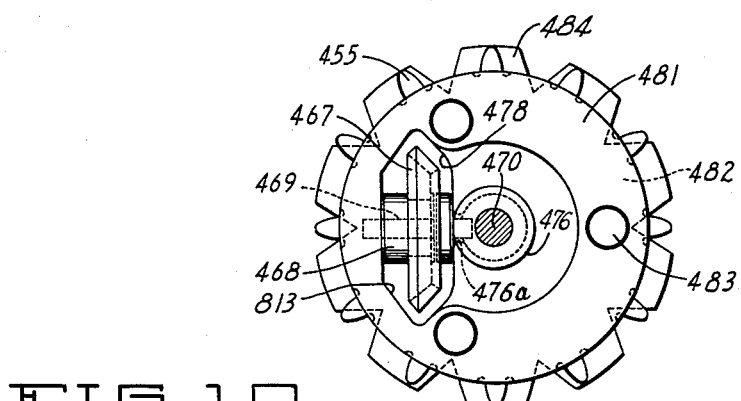

FIG. 10 is a top view taken along the lines 10—10 of FIG. 9.

Figure 11:
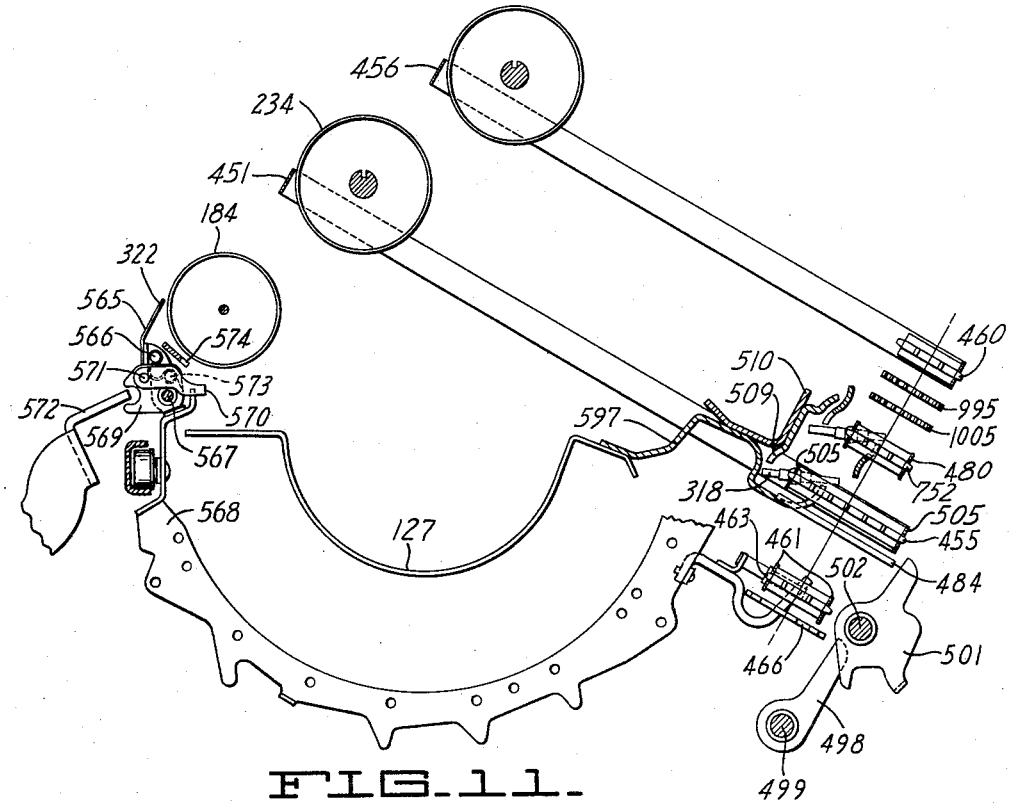

FIG. 11 is a right side view showing the relationship of the storing carriage, the set-up carriage and the two decimal indicator tapes.

Figure 12:
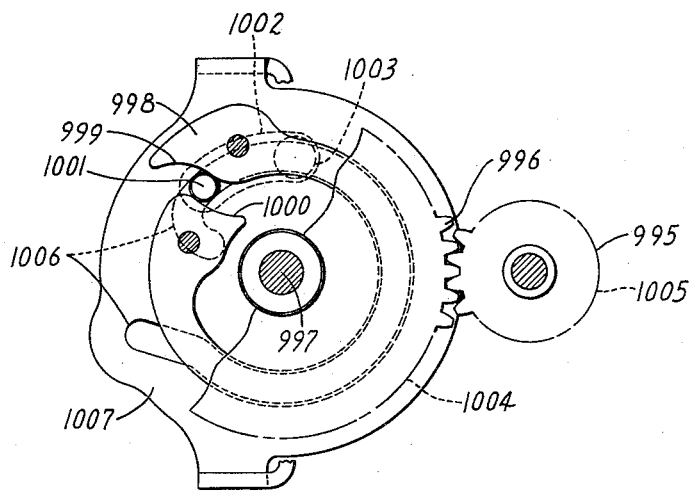

FIG. 12 is a top view of a lost motion mechanism.

FIG. 13 is a right side view of the decimal key and associated control mechanisms.

FIG. 13A is a detail view of a portion of the mechanism shown in FIG. 13.

FIG. 14 is a right side view of the drive train for the numeral wheel actuating mechanism and various clearance mechanisms.

FIG. 15 is a front view of the drive engaging and disengaging means for the actuator and clearance drive trains.

FIG. 16 is a right side view of the decimal key unlatching and recocking mechanisms.

Figure 17:
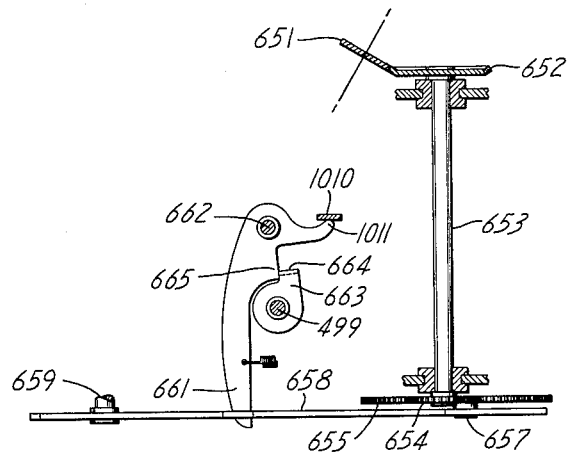
Figure 18:
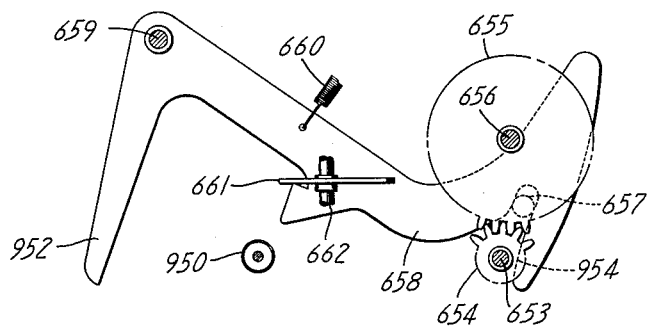

FIGS. 17 and 18 are right side and top views, respectively, of the restore mechanism for the upper dial decimal tape.

Figure 19:
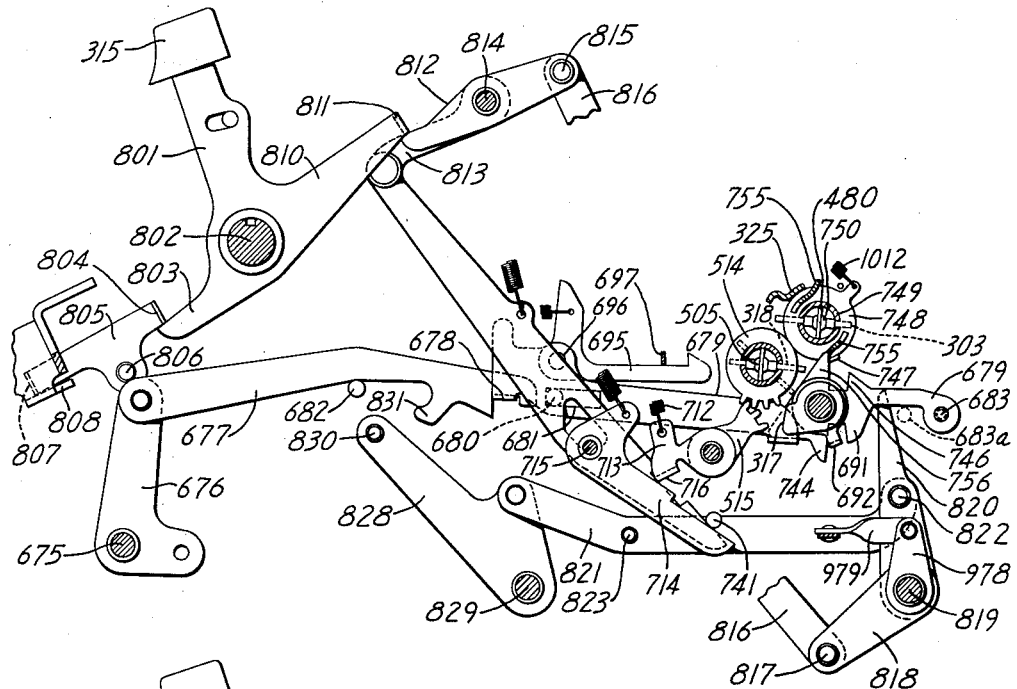
Figure 20:
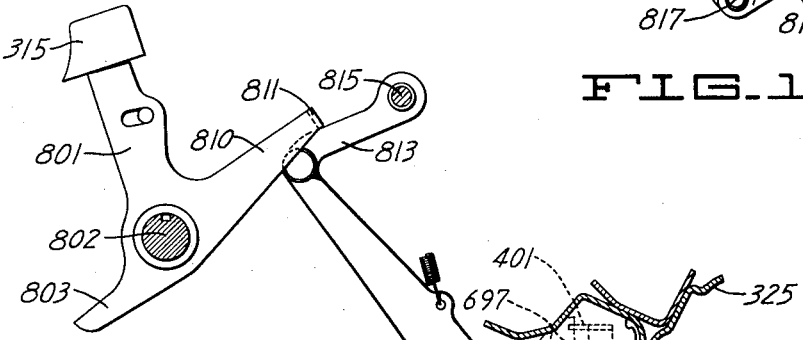

FIGS. 19 and 20 are right side views of the right shift key and associated decimal and shift mechanisms.

FIG. 21 is a right side view of the decimal key mechanism in operated position.

FIG. 22 is a right side view of the decimal shift key and associated mechanisms.

Figure 23:
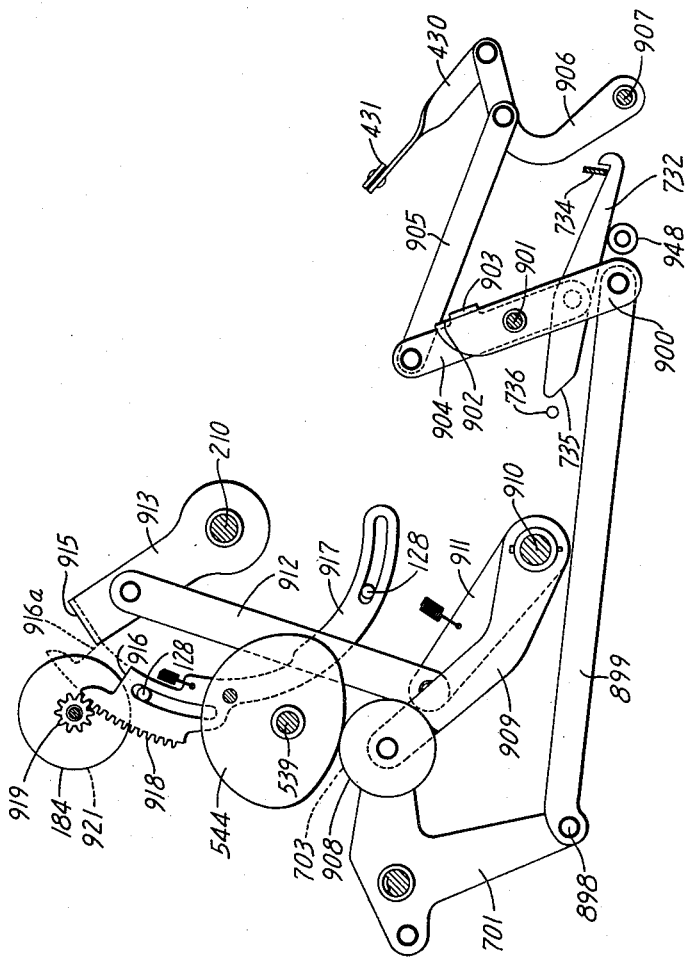

FIG. 23 is a right side view of the lower dial restore mechanism.

Figure 24:
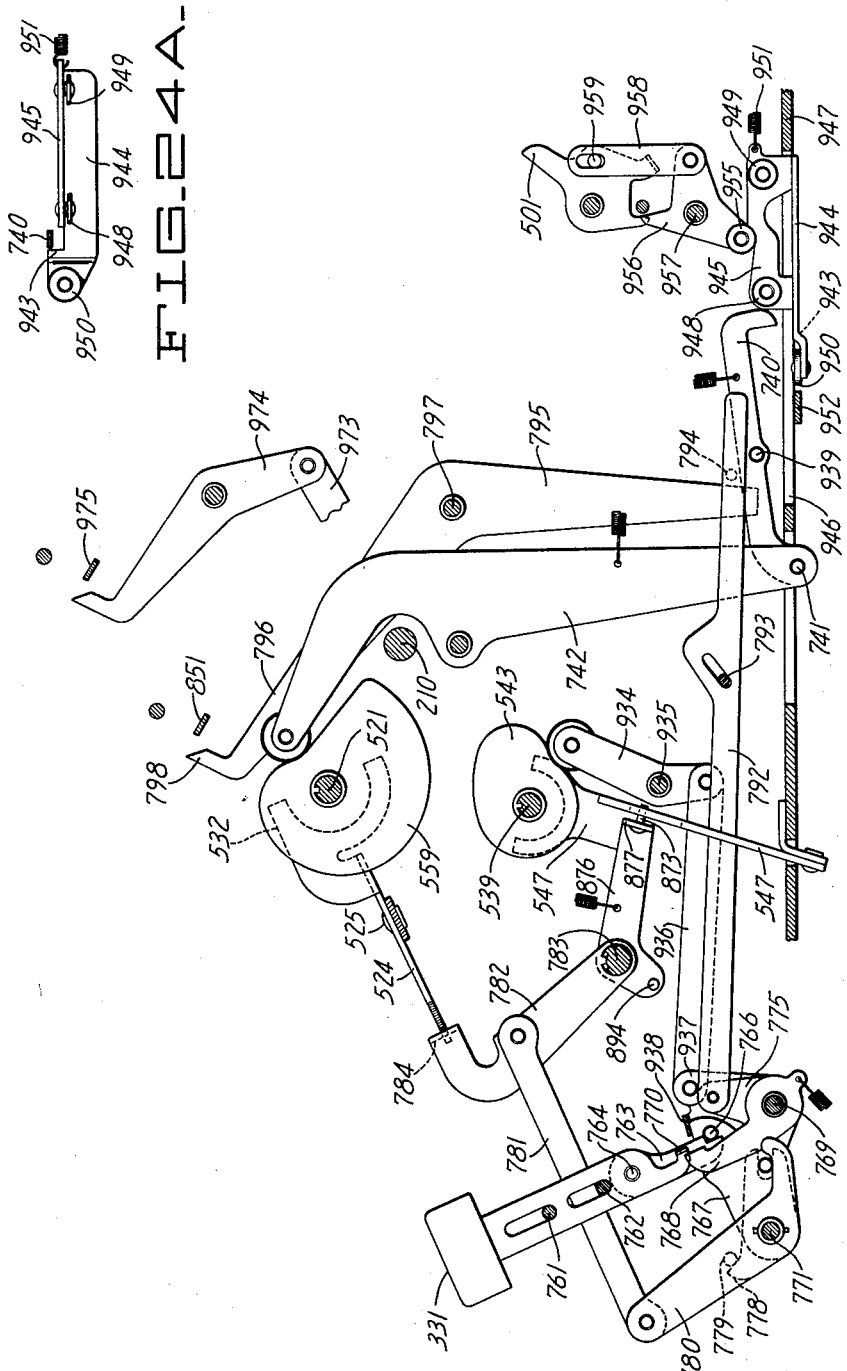

FIG. 24 is a right side view of the middle dial clearance mechanism.

FIG. 24A is a plan view of the sliding carriage shown in FIG. 24.

Figure 25:
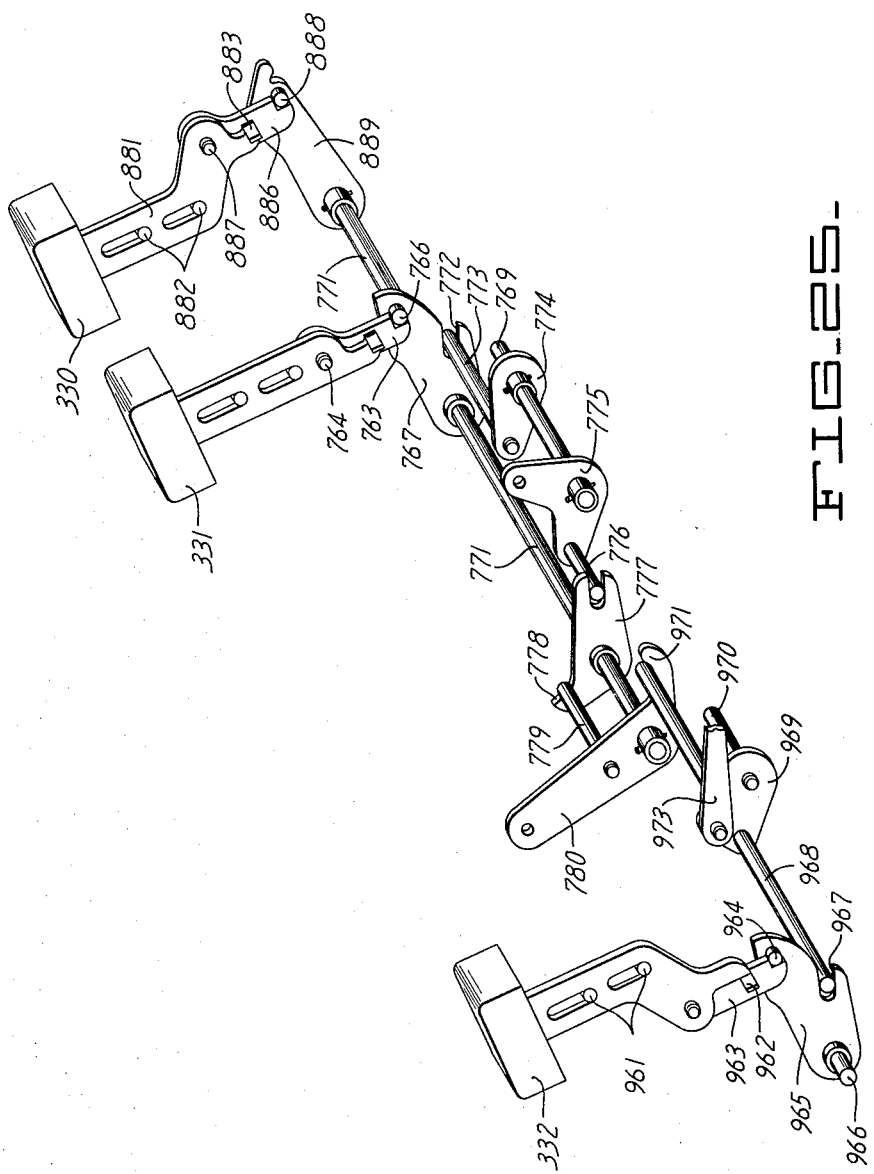

FIG. 25 is an exploded projection of the three clear keys.

Figure 26:
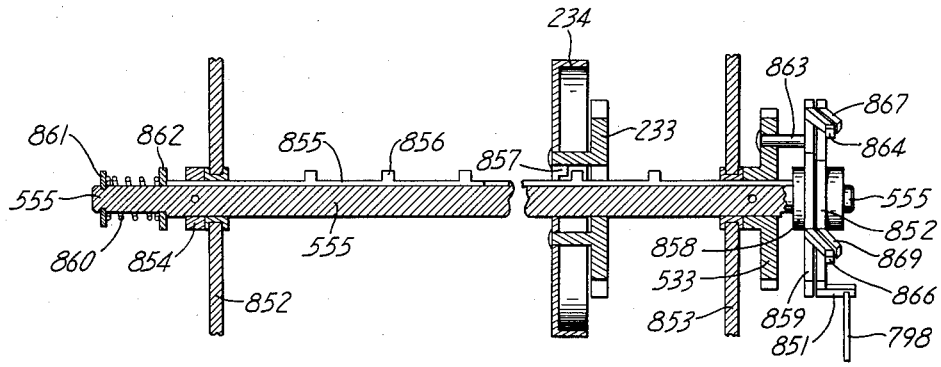

FIG. 26 is a front view, partially in section, of the middle dial clearance shaft.

Figure 27:
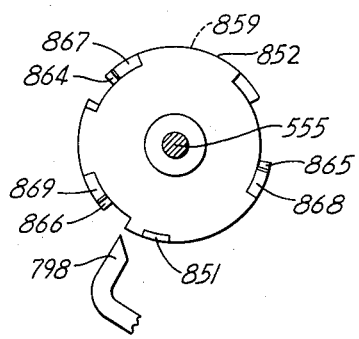

FIG. 27 is a right side view of the middle dial clearance mechanism.

Figure 28:
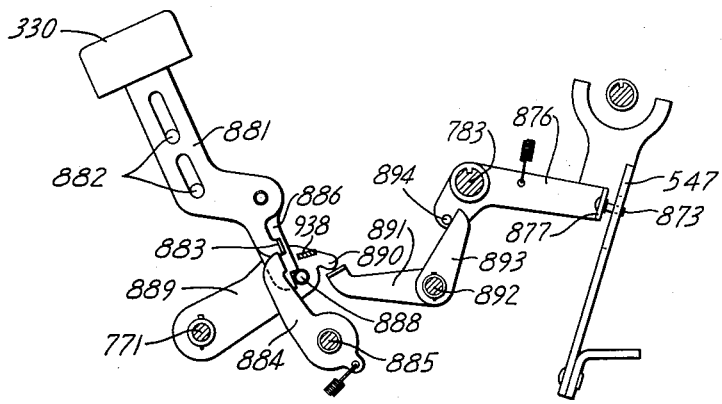

FIG. 28 is a right side view of the lower dial clear key and associated mechanisms.

Figure 29:
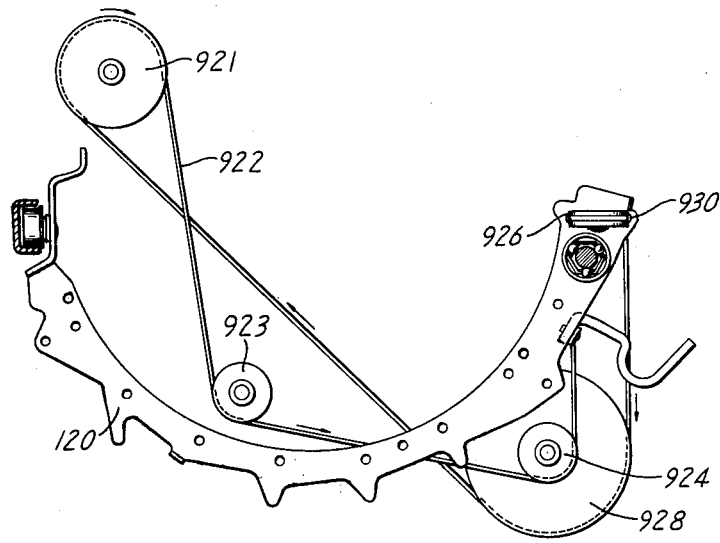
Figure 30:
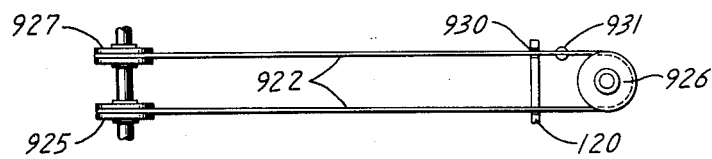

FIGS. 29 and 30 are right side and top views, respectively, of the set-up carriage restoring mechanism.

GENERAL DESCRIPTION

The invention is disclosed as embodied in a calculating machine having ten value entry keys 100–109 (FIG. 1), factor indicator dials 184, an accumulator register 225, and a counter register 300. The two registers are fixed within the framework of a machine.

Decimal point indicators 322, 312, and 302 are provided for the indicator dials 184, the accumulator register 225 and the counter register 300, respectively. Integrated control mechanisms are provided for the decimal indicators which mechanisms are operable by the value entry keys, 100–109, a decimal key 230, and shift keys, 315 and 320, to automatically point off the decimal values in the indicator dials, the accumulator, and counter registers.

The actuating mechanism for the numeral wheels of the accumulator register 225 is the same as that shown in the copending U.S. patent application Serial No. 471,694, now Patent No. 2,832,540, of Howard Mial Dustin et al., for calculating machines, filed November 29, 1954, and comprises a plurality of numeral wheel clutches one of which is permanently associated with each numeral wheel. The numeral wheel clutches are engaged and disengaged under the control of a plural order shiftable pin carriage generally indicated at 125 (FIG. 1) and referred to hereinafter as the storing carriage. The keys 100–109 are depressed with the most significant digit being entered first and the selected value is entered into the storing carriage through the intermediary of a single order set-up device which escapes one order relative to the storing carriage for each ordinal value that is entered. The values so entered appear in the indicator dials 184 of the storing carriage. A handcrank 333 (partially shown) comprises the drive means and is provided for transferring a value from the indicator dials 184 to the accumulator register 225.

The pin carriage 125 (FIG. 1) is disclosed as having eight orders and remains stationary during the value entry operation. In its initial stationary position the highest order of the storing carriage is aligned with the next to the highest order of the accumulator register 225, the highest order of the register being provided as an overflow order.

Depression of each of the value keys acts through a respective linkage described below, to rock a respective one of ten bellcranks which are carried by the set-up carriage, and which bellcrank, in turn, ejects a respective value pin in the storing carriage. Simultaneous with such ejection, the set-up carriage is shifted to the next lowest adjacent order of the storing carriage so that depression of the next value key ejects a correspondingly valued pin in that order, etc.

VALUE ENTERING MECHANISM

Since the principle of operation of all of the keys 101–109 is the same, only the "9" key will be described in detail in connection with a value entry operation. The "0" key does not enter a value, as such, but merely escapes the set-up carriage one order in the usual fashion.

The "9" value entry key 109 (FIG. 2) is mounted for up and down sliding movement within the framework of the machine and overlies an extension of a bellcrank 111 which is pivotally mounted at 112. A link 113 connects the bellcrank 111 with a lever 116 which is pivotally mounted at 7. A second lever (not shown) is similar to lever 116 and is also pivoted at 117. A bail 139 is supported by similar levers 116 and engages the bifurcated tip of a bellcrank 149 which is pivotally mounted at 118 to a set-up carriage 120. The bail 139 extends transversely of the machine so that operative engagement between the bail and bellcrank 149 is maintained regardless of the shifted position of the set-up carriage 120. It will be apparent that depression of the value key 109 acts through the bellcrank 111 to rock the bail 139 in a counterclockwise direction, thus imparting clockwise movement to the bellcrank 149. The latter is one of nine similar bellcranks which are each pivotally mounted on the arcuately shaped set-up carriage 120. The general configuration of the set-up carriage is indicated in FIG. 11, by a frame member 568 which forms a portion of the carriage. Concentric with the frame member 568 is a top plate 127 which forms a portion of the storing carriage 125 (FIG. 2).

The set-up carriage 120 is mounted for ordinal shifting movement by means of: (1) a roller 121, carried by the upper left end of the carriage, which roller is embraced by a transverse channel bar 122 fixed within the framework of the machine, and (2) a roller bearing assembly 123 carried by the upper right end of the carriage, which bearing is mounted on a transverse shaft 124.

A spring 205 is connected at one end to the upper rightmost end of the set-up carriage 120, and at its other end the spring is connected by means (not shown) to the storing carriage 125 so that the spring constantly urges the set-up carriage 120 in a direction of descending orders relative to the storing carriage. Such movement normally is prevented by an escapement pawl 202, carried by the upper rightmost end of the set-up carriage and spring urged into engagement with respective teeth of a rack 204 fixed to the storing carriage.

The storing carriage 125 comprises the previously mentioned top plate 127 (FIGS. 2 and 11) and a bottom plate 26 (FIG. 2). The upper left end of plate 127 is bent to the left and rigidly connected to plate 126. The two right ends of plates 126 and 127 are connected to a ball bearing assembly 196 which is freely mounted on a transverse shaft 197. Respective ordinally arranged plates 179, one of which is shown in FIG. 2, are fixed between the top and bottom plates 126, 127 and maintain spaced relationship therebetween. The upper left ends of plates 179 carry bearings 198 which are mounted on a transverse shaft 199.

Nine value pins such as the "9" pin 169 are slidably mounted between each adjacent pair of ordinal plates 179, and normally the pins stand in retracted position shown, the pins being arranged radially with respect to a main actuator shaft 210. When a value key such as key 109 is depressed and the bail 139 rocks bellcrank 149 clockwise, the ear 149a on the bellcrank contacts ear 159 on pin 169 and moves the pin radially towards shaft 210 where the pin is locked by means not shown.

In each order in which a value pin is ejected, a second pin, referred to hereinafter as the "end" pin is ejected. The ejected value pin and the end pin serve, in each order, to engage and disengage a respective numeral wheel clutch during each cycle of numeral wheel actuation, as described hereinafter.

The "end pin" comprises a lever 177 which is pivotally mounted on a storing carriage spacing plate 179 and carries a tooth 170 which is moved to the dotted line position by depression of any of the nine value keys 101–109. The manner in which the end pin is raised is not pertinent to the present invention and is fully described in the previously-mentioned patent application Serial No. 471,694, it being now sufficient to note that the end pin and a selected one of the ejected selection pins control the duration of engagement of a respective numeral wheel clutch 230.

Means are also described in the last mentioned patent application whereby the depression and release of any value selection key 100–109 reciprocates the escapement pawl 202 to permit the set-up carriage 120 to shift one order relative to the storing carriage 125. At such time the machine is prepared to receive a second digital value by depression of one of the keys 100–109. This process is repeated until the selected value is entered into the storing carriage 125.

*Numeral Wheel Actuators*

A numeral wheel clutch, generally indicated at 230 (FIG. 2), is permanently associated with each numeral wheel 234. The clutch includes a drive element 240 shown in dotted lines, and a driven element 231. The drive element is fixed to the shaft 210. The driven element 231 comprises a gear 231 having internal teeth 236 and carried by a disc shown as shaded, which disc is freely mounted on shaft 210. Gear teeth 236 are clutched and declutched from the drive element 240 under the control of the previously described pins 161—170 of the storing carriage. Gear teeth 231 are in mesh with the teeth of an idler gear 232 which drives the numeral wheel gear 233 and the numeral wheel 234.

Shaft 210 is rotated once for each rotation of the handcrank and carries the drive element 240 with it during such rotation. A pair of meshing gear segments 241 and 242 are pivotally mounted at 239 and 243 on the drive element 240 and are so arranged that during rotation of element 240 in a clockwise "plus" direction, a projection 254 on the segment 241 contacts the end pin 170, thus rocking segment 241 in a counterclockwise direction about its pivot on element 240. Meanwhile, the meshing segment 242 is rocked in a clockwise direction. Segment 241 carries a pin 246 which projects into a camming slot 247 in a clutch connecting pawl 238 also pivotally mounted on the drive element 240, and the arrangement is such that the counterclockwise movement of segment 241 and its pin in the camming slot of the pawl causes an ear 237 of pawl 238 to move into engagement with the internal teeth 236 of the driven element 231. With this condition the continued rotation of the drive element 240 causes rotation of the driven element 231. The latter is connected through idler gear 232 to a gear 233 fixed on the numeral wheel 234.

Meanwhile, the above-described clockwise movement of gear segment 242 moves a projection 251 on the segment 242 into the plane of the pins 261—269 so that further rotation of the drive element 240 brings the projection 251 into contact with the selectively raised pin 161—169 and rocks the segment 242 back to its initial position with respect to the drive element 240. At such time, the segment 241 is also returned to its initial position, and through the above-mentioned pin and slot arrangement returns the clutch pawl 238 to disengaged position, thus disconnecting the drive and driven elements. During negative actuation, the drive element 240 is rotated in the counterclockwise direction in which case the selected one of the pins 161—169 causes engagement of the clutch, and the end pin 170 causes disengagement of the clutch.

It should be noted that the end pin 170 is located in a position which is transversely offset from the plane of the pins 161—169 and that the projections 251—252 and 253—254 on the segments 242 and 241, respectively, are bent in opposition to each other for cooperation of each projection only with its respective controlling pin, all of which is described in the previously mentioned patent application Serial No. 471,694 to which reference may be had for a more detailed description of the actuating mechanism.

A tens carry mechanism is not shown but may be of the type disclosed in the Patent No. 2,694,524 issued November 16, 1954, and is operable to drive the gear 255 (FIG. 2), which in turn drives idler 232 and the numeral wheel 234.

*Storing Carriage Shift Mechanism*

The shifting mechanism for the storing carriage 125 (FIG. 1) includes two opposed springs, one for shifting the carriage toward the right and the other for shifting the carriage toward the left, together with spring latching, releasing, and recocking means whereby a latch, in one instance, releases the stronger of the two springs and causes shifting of the carriage in one direction against the weaker spring. Means are also provided for recocking the stronger spring and then releasing the carriage from a latch for return movement under the stress of the weaker spring. A spring shift mechanism employing the principles outlined above is disclosed in the U.S. patent application S.N. 461,414, filed October 11, 1954, now Patent No. 2,896,846 issued July 28, 1959. The present spring shift mechanism is different in form from that shown in the application but operates under the principles taught therein.

FIG. 6 is a top view of a portion of the storing carriage 125 and the shift mechanism therefor. A hook 401 is fixed to the left end of the storing carriage and, in the initial position of the parts, is engaged by a lock lever, or latch 402, which holds the carriage in its leftmost position. A spring 403 provides the power for moving the carriage toward the right, and a weaker spring 404 returns the carriage toward the left as follows.

Spring 403 is connected to a framework 405 of the machine, and at 406 is connected to a right shift lever 407. The latter is pivoted on a fixed pin 408 and has an upper arm 409 which carries a pin 410. The pin 410 serves as an anchor for the left shift spring 404, the function of which is fully described below. Pin 410 extends into a slot 411 in a right shift link 412. The leftmost end of link 412 is pivotally connected at 413 to a supporting lever 414 which is pivoted at 415 to the framework of the machine. Also pivoted at 413 is a short link 416 which, at its right end, is pivotally connected at 417 to both a shift lever 418 and an escapement segment 425. The latter is pivoted on a fixed pin 426. The upper end of lever 418 is pivotally connected at 419 to a link 420 which is pivoted on a fixed pin 421.

It will be noted that the two pivot points 417 and 419 for the shift lever 418 are so arranged that movement of the shift link 412 toward the right and the resulant compression of the four bar linkage 414, 420, 416, and 418 (also referred to as modified lazy tongs) causes the lower end of lever 418 to be moved to the right in substantially a straight line coinciding with the direction of shift of the storing carriage 125. However, since there may be some slight variation from a straight line movement, lever 418 is connected to the storing carriage by means of a link 125' which is pivotally mounted on the storing carriage frame.

From the foregoing description, it is seen that spring 403 constantly exerts a force (through the shift lever 407, pin 410, link 412, the modified lazy tongs 414, 420, 416 and 418, and the link 125') tending to move the storing carriage toward the right but is prevented from exercising such force due to the latch 402 which holds the storing carriage in the position shown.

Assume now that a problem of addition is being performed, and that a value is being entered into the storing carriage. During such entry, the decimal key is depressed, which, as explained hereinafter, rocks the latch 402 out of engagement with the storing carriage hook 401. At such time, spring 403 operates through the shift linkage described above to move the storing carriage toward the right to a position in which the decimal point of the selected value in the storing carriage is aligned with the predetermined decimal position of the accumulator register, as described in the previously mentioned Patent No. 2,702,668. During such shifting movement, the escapement segment 425 is rotated in a clockwise direction about the pivot 426 by means of link 416 and pin 417. Segment 425 has nine upturned teeth 427, and the eight spaces between the teeth correspond to eight ordinal increments of shift movement of the storing carriage.

Assume, for purpose of illustration, that the carriage is permitted to escape five orders to the right from the initial position shown in FIG. 3B to that shown in FIG. 3C. At such time, the toothed segment 425 (FIG. 6) will be rotated five increments in a clockwise position from that shown and also the right shift lever 407 will be rocked a proportionate amount in a clockwise direction. Meanwhile, the clockwise movement of lever 407 moves pin 406 away from the tail 437 of a detent 438 and the latter swings counterclockwise about its pivot 439 in response to the urging of a spring 440. Surface 441 on detent 438 is cammed upwardly as the successive teeth 427 pass beneath the detent during the rightward shifting movement of the storing carriage; however, the back surface 442 on the detent falls in behind a respective tooth after the shift is completed and blocks the return leftward shifting movement of segment 425 and of the carriage 125, as is explained shortly hereinafter.

With the carriage standing in a position of decimal alignment with the accumulator decimal indicator, as above mentioned, the machine is now ready for a single rotation of the handcrank to enter the selected value into the accumulator register after which the storing carriage 125 is returned to its initial position by spring 404 as follows:

Rotation of the handcrank causes upward movement of a short link 430, as described hereinafter. Link 430 is pivotally connected to the rightmost arm of a restore lever 431, pivotally mounted to the framework of the machine at 408. Lever 431 has an ear 431a which picks up the tail 433 of lever 407 and returns the latter to a position slightly counterclockwise from the position shown where it is temporarily locked by a latch 432 which engages an ear 435 on the lever 407.

Since the storing carriage is locked in its current position at this time by the engagement of detent 438 with the escapement segment 425, the link 412 is also maintained in its current position. The right end of link 412 has an ear 443 to which is connected the rightmost end of the left shift spring 404. With this arrangement, the return counterclockwise rocking of lever 407 stresses spring 404, thus storing power for returning the storing carriage to its leftmost position. Such return occurs almost immediately after the lever 407 is rocked to its extreme counterclockwise position by virtue of the pin 406 on the lever 407 striking the tail 437 of detent 438. This unlocks segment 425, the four bar linkage 414, 420, 416, 418, and permits spring 404 to pull link 412 toward the left, thus returning the above-mentioned parts and the storing carriage 125 to the initial position shown. The storing carriage is locked in this position by the latch 402. It should be noted that the timing of the operation of the above mechanism is such that detent 438 does not release the storing carriage for return leftward movement until numeral wheel actuation is completed.

When segment 425 returns to its initial counterclockwise position as mentioned above, a tail 444 on the escapement segment strikes an ear 445 on the latch 432, thus releasing the left shift lever 407 to the urgency of the left shift spring 403. Thus, with the storing carriage locked in its leftmost position and the lever 409 spring-stressed to rock clockwise, the machine is restored to its initial condition in preparation for entry of the next factor of the addition problem.

During the operation of the machine in problems of addition and subtraction, there will be no occasion to depress the right shift key 315 (FIG. 1) or the decimal shift key 320; however, during multiplication and division operations, one or both of these keys may be depressed to cause a single step of escapement of the storing carriage. For this purpose, the depression of either of these keys enables a pair of escapement control pawls 447 and 448 (FIG. 6) for cooperation with the teeth 427 of the escapement segment 425.

Normally, pawls 447 and 448 stand clear of the teeth 427 to permit unrestricted movement of the segment 425 during problems of addition and subtraction; however, during multiplying and dividing operations, all shift operations are single ordinal shifts, and the pawls 447 and 448 are sequentially enabled by depression and release of the right shift key as is made clear in the sections relating to decimal and shift key controls.

*Counter Register Actuator*

The actuator for the counter register comprises a single toothed element 1020 (FIG. 7) which is slidably keyed to a shaft 1021. The latter is driven in a 1:1 ratio with the main actuator shaft 210 through gearing not shown. Each cycle of operation of the main actuating mechanism causes a single revolution of the single tooth 1020 which advances a train of idler gears and the counter numeral wheel gear 1022 by a single digital increment.

During problems of multiplication and division the counter actuator 1020 is shifted order by order with the storing carriage; in problems of addition and subtraction, however, the counter actuator is locked in an initial leftmost ordinal position with respect to the counter register 300.

The hub of the single toothed element 1020 (FIG. 7) has a peripheral slot which is embraced by a yoke 1026. The latter depends from the upper extension 1027 of a carriage generally indicated at 1028. The carriage 1028 is guided for shifting movement by the shaft 1021 and also a pair of rollers 1029 and 1030 which are mounted between the carriage 1028 and an extension 1031 fixed thereto, and which rollers embrace a transverse shaft 1032, fixed within the machine framework.

A latch lever 1040 (FIG. 7) is pivoted to the machine framework at 1041 and is spring urged counterclockwise into restraining contact with extension 1035 of the carriage 1028. This is the normal position of the latch lever 1040 during problems of addition and subtraction during which the counter actuator is locked relative to the counter register, as previously mentioned. During division and multiplication operations, however, the latch lever 1040 is disabled in the following manner to permit the counter actuator to shift with the storing carriage.

Depression of the multiply-divide key 307 (FIG. 7) rocks a bell-crank 994 and a shaft 892 counterclockwise as described hereinafter, to condition the machine for plural cycle actuating operations. A link 1044, which is pivotally connected to bellcrank 994, also has pivotal connection with the latch lever 1040. Thus, depression of the multiply-divide key rocks the latch lever 1040 clockwise to disabled position where it is held as long as the key stands in depressed position.

A coil spring 1033, fixed at one end to an ear 1034 on the counter actuator carriage 1028 and at the other end to the framework of the machine, normally urges the carriage 1028 toward the right side as seen from the front of the machine. When the latch lever 1040 is rocked clockwise the spring 1033 moves carriage 1028 toward the right of the machine to the extent permitted by contact of an extension 1045 on the carriage 1028 with a projection 125a on the storing carriage 125. Thus, each time the storing carriage is shifted one order, the counter actuator will partake of a similar movement.

When the storing carriage 125 is returned to its initial position during certain clearance operations described hereinafter, the storing carriage returns the counter actuator carriage 1028 and the actuator element 1020 to their initial leftmost position. The depression of the plus-minus key re-enables the counter actuator carriage in its initial position to be locked by the latch lever 1040.

Drive Mechanism

The handcrank 333 (FIG. 1) normally is connected to the numeral wheel actuating mechanism; however, upon depression of any one of the three clear keys 330, 331 or 332, the handcrank is disconnected from the actuating mechanism, and is connected to a clearance drive mechanism which, in turn, drives a respective one of the three clearance mechanisms in accordance with which clear key is depressed.

The handcrank is fixed on a shaft 521 (FIG. 15), suitably mounted for rotation in the framework of the machine. A drive transmitting clutch member 522 is slidably keyed to shaft 521 and rotates therewith. Member 522 has a circumferential groove 532, and a yoke 524 rests within the groove. The yoke is pivotally mounted to the machine framework at 525 and is urged in a counterclockwise direction (by a spring not shown) thus holding a pin 526 on member 522 in a notch cut within a gear 527. The latter is freely mounted on shaft 521 and meshes with a gear 528 (FIG. 14) fixed on the main actuator drive shaft 210. With this condition of the parts, the rotation of the handcrank causes rotation of the actuator drive shaft 210 and the numeral wheel clutches, as previously described.

During problems of addition and subtraction, each plus or minus cycle of actuation is followed by automatic clearance and return of the set-up and selection storing carriages to their initial leftmost positions. For this purpose, a gear 537 (FIG. 15) is fixed on the handcrank shaft 521 and this gear drives a gear 538 which is fixed on a shaft 539. A clutch drive member 540, which is similar to the above-described clutch member 522, is slidably keyed on shaft 539 and carries a pin 541 which normally engages within a notch in a cam 544 so that rotation of the handcrank also rotates the cam.

Cam 544 (FIG. 16) acts through a roller 703 to rock a bellcrank 701 clockwise and raise the decimal key to its initial position as is later described in connection with the decimal key. Bellcrank 701 also serves through the articulated linkage shown in FIG. 23, to restore the selection storing carriage to its initial leftmost position. For this purpose, bellcrank 701 has a lower depending arm which is pivotally connected at 898 to a link 899, the opposite end of which is connected to a lever 900 freely mounted on a shaft 901. The upper end 902 of lever 900 lies adjacent an ear 903 on a lever 904 which is also freely mounted on shaft 901. A link 905 connects lever 904 to a lever 906 which is freely mounted on a shaft 907. The upper end of lever 906 is pivotally connected to the link 430, and link 430 (FIG. 6) is pivotally connected to the previously described lever 431. The rotation of cam 544 (FIG. 23) acts through the linkage described to rock lever 431 (FIG. 6) in a counterclockwise direction to operate the mechanism shown in FIG. 6 and restore the storing carriage 125 to its initial leftmost position where it is locked by the end latch lever 402, all as has been previously described.

The wide cam 544 (FIG. 23) also acts through a roller 908, located behind the roller 703, to rock a follower 909 counterclockwise, and through the mechanism described below to restore the lower dials to their initial "blank" registration and also to return the selection set-up carriage to its initial leftmost position.

Follower 909 is fixed to a shaft 910 to which are also fixed two arms 911 (only one of which is shown). Similar links 912 connects arms 911 to a pair of arms 913. The latter are freely mounted on the shaft 210, and a bail 915 is carried by the arms 913. Bail 915 extends transversely of the machine and overlies the shoulders 916 of a plurality of ordinally spaced slides 917 which are mounted by pin and slot connections on the pins 128 for arcuate movement about shaft 210.

At the upper extremity of each slide 917, an arcuate gear segment 918 is formed which is enmeshed with a pinion 919. The latter is integral with lower dial 184, and upon setting of a value in the dial, the pinion 919 rotates in a counterclockwise direction. At such time, the gear segment 918 moves upwardly and, according to the value entered, approaches the dotted line position 916A which is representative of a value of "9." This is the condition of the parts when the lower dial clear key is depressed and the handcrank is rotated once. At such time, cam 544 acts through follower 909, lever 911, links 912 and arms 913 to rock the bail 915 in a counterclockwise position, and through contact with shoulders 916 to restore the slides 917 and the lower dials to their initial blank positions where they are locked by means not shown. As shown in the previously mentioned patent application Serial No. 471,694 the restoration of the dials 184 to initial position also releases the latching means for the digit pins in the storing carriage which pins return to their initial positions.

Meanwhile, the bail 915 is also effective to return the single order set-up carriage 120 (FIG. 2) to its initial leftmost position relative to the storing carriage 125. For this purpose a pulley 921 (FIGS. 23 and 29) is located in axial alignment with the dials 184 on the left side of the dials. A gear 919 is also fixed to the pulley and is rotated clockwise by a segment 918, which normally stands in the dotted line position and which is moved to the full line position and then returned to the dotted line position during the clearance operation.

Pulley 921 (FIG. 29) is one of a plurality of pulleys which are carried by the storing carriage and which support an endless cord 922. The cord progresses from pulley 921 and around pulleys 923 and 924. From pulley 924 the cord moves upwardly and makes a 90° turn over a pulley 925 which is shown in a top view in FIG. 30. Pulley 925 is mounted of the leftmost side of the storing carriage. From pulley 925, the cord doubles back around a pulley 926 which is at the rightmost end of the storing carrriage and then progresses through a hole 930 (see also FIG. 29) in the rightmost rearward end of the set-up carriage 120. The cord then moves around a pulley 927 (FIG. 30) and from pulley 927, the cord drops down around a pulley 928 (FIG. 29) and returns to pulley 921.

A bead 931 (FIG. 30) is fixed on cord 922 and is of a diameter which is greater than the hole 930 in the set-up carriage 120. During a value entering operation the set-up carriage escapes from left to right for one or more orders depending on the number of ordinal digits entered in the storing carriage, eight being the maximum number of ordinal values that may be entered. During such entry the set-up carriage approaches the bead. In FIG. 30, the set-up carriage 120 is shown in its rightmost escaped position, and upon rotation of the handcrank, the pulley 921 (FIG. 29) is rotated in a clockwise direction as described above. This moves the cord 922 in the direction indicated by the arrows, and as shown in FIG. 30, the bead 931 will pick up the set-up carriage and return the same to its initial leftmost position on the storing carriage. Since the bail 915 (FIG. 23) spans the entire range of movement of the storing carriage, it will be obvious that the bail will engage the shoulder 916 of segment 918 regardless of the shifted positions of the set-up and storing carriages during the clearance operation. The return of the set-up carriage occurs during the first 180° of rotation of cam 544 (FIG. 23) and in the next 180°, the bail returns to the initial position shown, thus permitting pulley 921, the cord 922 (FIG. 30) and the bead 930 to return to the initial positions shown.

From the foregoing, then it will be clear that the cam 544 (FIG. 23) performs four functions during a lower dial clearance operation: (1) it returns the decimal key to its raised position; (2) it returns the plural order storing carriage 125 to its initial leftmost position; (3) it resets the lower dials to "blank" indicating position; and (4) it returns the single order set-up carriage 120 to its initial leftmost position on the storing carriage.

The foregoing description has been concerned only with the actuator and clearance drive mechanisms which are operable during addition and subtraction. Specific clearance mechanisms are described later which also serve to restore portions of the decimal mechanisms not yet described.

*Decimal Indicating Mechanism*

The decimal indicating mechanism includes an upper decimal indicator 302 (FIG. 1) for the counter register 300 and a middle decimal indicator 312 for the accumulator register 225. The counter and accumulator decimal indicators 302 and 312 are each fixed on respective tapes 456 and 451 (FIGS. 8 and 11) which are mounted underneath the machine cover for shifting movement relative to a respective series of holes 511 and 308 (FIG. 1) related to the counter and accumulator registers. Each tape carries a mark of distinguishing color which appears through the holes to indicate the position of the decimal relative to its respective register. A third tape 461 is provided which is associated with an extension 496 of the selection set-up carriage frame, and is referred to hereinafter as the lower tape. Tape 461 does not show the decimal point for the lower indicator dials 184 (FIG. 1), but serves as a control device for a purpose made clear in the next paragraph.

A decimal indicator 322 is provided for showing the decimal position of the value entered in the storing carriage 125 but this indicator 322 does not co-act with the automatic decimal mechanism mentioned above and should not be confused with references to the lower tape which does co-act with the automatic decimal mechanism. Thus, the decimal indicator 322 is merely provided as a convenience in showing the position of the decimal in the selected value which is shown in the indicator dials 184.

The upper decimal tape 456 (FIGS. 8 and 9), the middle decimal tape 451, and the lower tape 461 are all perforated and each engages with a respective one of three sprockets 460, 455 and 463 comprising a differential gear unit 450 whereby the movement of any one tape, while a second tape is held fixed, drives the third tape by an amount corresponding to the movement imparted to the first tape.

The lower tape 461 is selectively controlled by the movement of the single order value set-up carriage and normally is shiftable therewith. The middle decimal tape 451 which is associated with the accumulator register, or middle dials, may be selectively driven by connecting and disconnecting the same to a rack 509 (FIG. 11) carried by the storing carriage. The upper decimal tape 456, on the other hand, is not directly connected or disconnected to any ordinally shiftable part of the calculator, but merely serves as one leg of the differential which may be driven by movement of either one of the other two legs, i.e., the lower or middle decimal tapes.

It was previously mentioned that the lower tape 461 is selectively controlled by the movement of the set-up carriage. Actually no physical connection is effected, the arrangement being such this tape is spring urged to follow the shifting movement of the set-up carriage, means being provided to selectively lock the lower tape by connecting it to the framework of the machine. Means are also provided for locking the middle decimal tape to the framework of the machine. Obviously, if both the lower and middle tapes are locked, the upper tape is also locked through the differential gearing.

Separate locking means are also provided to hold the upper tape in a given ordinal position, whereupon shifting movement of either the lower or the middle tape will cause a corresponding movement of the middle tape or the lower tape, and vice versa.

By way of introduction, the general operation of the decimal control mechanism will be described in connection with three problems.

A problem of addition (125+23) is schematically illustrated in FIGS. 3A to 3G. In FIG. 3A, the counter register 300, the accumulator register 225, and the indicator 184 are shown in their initial cleared condition. The respective decimal indicators 302 and 312 for the counter and accumulator registers are shown in their initial positions which is between the first and second leftmost orders of the registers. In each register, the leftmost order is an "overflow" order.

The previously mentioned lower decimal tape 461 which forms the third leg of the differential is not shown but the movement thereof is indicated by the movement of a schematically shown reference lug 461a.

A small rectangle 318 represents a lug associated with the single order selection set-up carriage. A small triangle 317 represents a lug which is mounted upon a pivot fixed within the framework of the machine for a purpose presently made clear.

With the machine cleared as shown in FIG. 3A, the decimal indicator 302 for the counter dials, referred to hereinafter as the upper dial decimal indicator (U.D.D.), is locked in the position shown. The accumulator, or middle dial decimal indicator 312 (M.D.D.) is unlocked, as is the lower decimal (L.D.) 461a. To enter the value "125," the operator depresses the value entry keys "1," "2" and "5" in that order, and these values are entered into the value indicator 184 (FIG. 3B). This entry escapes the set-up carriage, the lug 318, and the factor decimal indicator 322 for the storing carriage one order to the right for each of the three ordinal values "1," "2," and "5" which are entered. Also, the L.D. 461a is moved three orders to the right with the set-up carriage. Since the U.D.D. 302 is locked, at the beginning of the problem, the three order movement of the L.D. 461a acts through the previously mentioned decimal planetary gearing to move the M.D.D. 312 three orders to the right with the L.D. 461a. This condition is shown in FIG. 3B.

The decimal point key is now depressed which does four things: (1) it unlocks the U.D.D. 302 from the machine frame, (2) it locks the L.D. 461a in its current position, (3) it connects the M.D.D. 312 to the storing carriage 125, and (4) it releases the storing carriage 125 for escapement to the right. The single order set-up carriage is locked in its current position relative to the storing carriage and escapes with it. The storing carriage and pin 318 freely escape to the right where further movement is stopped after five orders of escapement by the engagement of lug 318 with the fixed lug 317 as shown in FIG. 3C. The M.D.D. 312 which is locked to the storing carriage therefore moves five orders to the right. Since the L.D. 461a was locked in the position shown in FIG. 3B, and since the U.D.D. 302 is now unlocked, the five order movement of the M.D.D. 312 acts through the decimal planetary to move the U.D.D. 302 five orders to the right with the storing carriage 125. This condition is shown in FIG. 3C. It will be noted that since the set-up carriage moved with the storing carriage five orders to the right, the set-up carriage is in proper position to permit depression of the value entry keys to enter fractional values in the storing carriage. In the present example, however, no fractional values are so entered.

The handcrank is now turned once in an additive direction to enter the value of "125" into the numeral wheels of the accumulator register 250, and since the machine has been conditioned for addition by depression of the plus-minus key 306 (FIG. 1), the hand crank also drives mechanisms which do four other things: (1) it locks the M.D.D. 312 (FIG. 3C) in its current position, (2) it unlocks the L.D. 461a and (3) it returns the storing carriage 125 and the set-up carriage to their initial leftmost positions. During such return movement the set-up carriage picks up the L.D. 461a and returns it three orders to the left to its initial position all of which is shown in FIG. 3D. Since the M.D.D. 312 is locked and the U.D.D. 302 is unlocked during the three order return movement of the L.D. 461a, the latter acts through the decimal control planetary to move the U.D.D. 302 three more orders to the right (FIG. 3D).

The above-mentioned fourth function of the handcrank is to move the lug 317 (FIG. 3C) out of the path of lug 318 on the storing carriage and instead enable a "floating add stop" 303 (FIG. 3D) for subsequent cooperation with an element 325 fixed on the storing carriage. This condition of the parts is shown in FIG. 3D, and the machine is now ready to receive the next value of "23" which is to be added to "125." It should be noted that the floating add stop 303 is fixed relative to the upper decimal tape and therefore moves with the U.D.D. 302.

Referring to FIG. 3D, it will be seen that the leftmost order of the storing carriage 125 is in alignment with the eighth order to the left of the M.D.D. decimal 312, and that the floating add stop 303, the position of which is determined by the U.D.D. 302, is displaced eight orders to the right of the element 325 on the storing carriage.

The keys "2" and "3" are now depressed to enter the value "23" into the storing carriage. Since the M.D.D. 312 is locked at this time and the U.D.D. 302 and L.D. 461a are unlocked, the L.D. is free to follow the two order rightward movement of the set-up carriage during the entry of the value "23." This movement of the L.D. 461a is transmitted to the decimal planetary, and results in moving the U.D.D. 302 and the floating add stop 303 two orders to the left as shown in FIG. 3E. Thus, when the decimal key is depressed there is a difference of six orders between the fixed element 325 on the storing carriage and the floating add stop 303. The depression of the decimal key now does only two things: (1) it locks the L.D. 461a in its current position, and (2) it releases the storing carriage 125 for shifting movement to the right. Since the M.D.D. 312 is already locked to the framework of the machine, and the decimal key similarly locks the L.D. 461a, the planetary decimal gearing is automatically locked to hold the U.D.D. 302 in its current position. This locks the floating add stop 303 in the position shown in FIG. 3E and thus stands in a position to stop the rightward shifting of the storing carriage 125 after a shift of six orders whereupon the element 325 on the storing carriage contacts the floating add stop 303 as shown in FIG. 3F. In this position, the decimal point of the value "23" is properly aligned with the value "125." A single turn of the handcrank now adds the value "23" to the value "125" in the accumulator register which then shows a value of "148." The rotation of the handcrank also returns the storing carriage 125 to its initial leftmost position and performs the other normalizing and decimal control functions previously described in connection with the entry of the first value "125."

At this time, the counter register shows an item count of "2," the accumulator register 225 shows a sum of "148" with the decimal properly pointed off, and the storing carriage 125 is in condition to receive another value, if desired. After the problem is completed, the counter and accumulator registers may be cleared by depression of the appropriate clear keys. Mechanisms, described hereinafter, are provided whereby the clearance of the accumulator register 225 also restores the decimal indicators 312 and 302 for the accumulator and counter registers to their initial positions. Also the clearance of the accumulator register disables the floating add stop 303 and re-enables the fixed add stop 317 so that the machine is prepared to perform another problem of addition or subtraction, if desired.

A multiplication operation is described next. Assume that a value of 151 is to be multiplied by 23.6. The multiply-divide key 276 (FIG. 1) is first depressed to condition the machine for multicyclic operation. This prevents automatic return and clearance of the storing and set-up carraiges after each cycle of actuation as was the case in the addition, previously described.

Starting with the machine in an initial cleared condition as shown in FIG. 3A, the multiplicand value of 151 (FIG. 4A) is entered into the machine by depressing the value keys in known manner, at which time the value 151.0 with the decimal properly pointed off is displayed in the storing carriage indicator dials 184. The U.D.D. 302 is locked and the M.D.D. 312 is unlocked at the beginning of a multiplication operation and therefore the three order movement of the selection set-up carriage in entering the value "151" with the resultant three order movement of the L.D. 461a to the right, causes a three order movement of the M.D.D. 312 to the right, all as is shown in FIG. 4A. The decimal key is now depressed which: locks the L.D. 461 in its current position (FIG. 4B); it locks the M.D.D. 312 to the storing carriage 125; and unlocks the U.D.D. 302.

The handcrank is now rotated two times, corresponding to the leftmost multiplier digit "2" in the multiplier value 23.6. Such rotation enters the value "2"×"151," or "302," into the middle dials 225, and the counter register 300 displays the multiplier "2." The right shift key 315 (FIG. 1) is now depressed and this shifts the storing carriage 125 one order to the right; since the M.D.D. 312 is locked to the storing carriage at this time, the M.D.D. 312 also shifts one order to the right. Also, since the L.D. 461 is locked, the U.D.D. 302 is moved one order to the right with the M.D.D. 312. This condition of the parts is shown in FIG. 4C. Note that the decimal indicator 322 for the value storing carriage 125 remains stationary with respect to the storing carriage, and although the carriage and the decimal indicator 322 are shifted one order to the right, the rightward movement of the decimal indicator 322 does not affect the other decimal indicators since the indicator 322 is independent of the automatic decimal control system, as previously mentioned.

The above-mentioned depression of the shift key also disables the fixed add-stop 317 (FIG. 4A) so that this stop, which is used only in addition and subtraction, cannot contact pin 318 on the storing carriage during multiplication operations.

With the storing carriage 125 standing in the position shown in FIG. 4C, the handcrank is rotated three times in a plus direction to enter the multiplier "3" into the counter register as shown in FIG. 4D. This enters the product of 3×151=453 into the product register, which, when added to the previous product of 3020, equals 3473.

Since the decimal point has been reached in the multiplier value, the decimal shift key 320 (FIG. 1) is now depressed which locks the M.D.D. 312 (FIG. 4E) in its current position and shifts the storing carriage 125 one order to the right. Since the L.D. 461 previously was locked, the locking of the M.D.D. 312 locks the planetary gearing and the U.D.D. 302 in the positions shown.

The fractional multiplier ".6" is now entered into the counter register by turning the handcrank six times in a plus direction which enters the product of .6×151=90.6 into the product register and adds it to the previous product of 3473.000 to produce a total of 3563.6 as shown in FIG. 4F. This completes the multiplication problem at which time the multiplicand, the multiplier, and the product are displayed and the decimal point in each is correctly positioned without any setting of the decimals on the part of the operator other than to enter the values into the machine in the same manner that one would write the value on paper. The clearance keys 330, 331 and 332 are now depressed and the handcrank is turned once to return the entire machine to initial cleared condition.

The clearance of the lower dials 184 unlocks and returns the L.D. 461a three orders to the left which movement meanwhile moves the U.D.D. 302 three orders to the right. This brings the U.D.D. 302 four orders from its initial position, it having been moved one order to the right during the multiplication operation. The clearance of the product, or middle, dials 225 unlocks and returns the M.D.D. 312 four orders to the left to initial position, meanwhile moving the U.D.D. 302 four orders to the left to its initial position. The above description has been given in the form of a sequence of operations whereas the clearance operations occur simultaneously, and the differential feed to the U.D.D. 302 is actually the difference of the return movements of the M.D.D. and L.D., i.e., a 4—3, or one order movement to the left of the U.D.D. The machine now stands in its initial cleared condition as shown in FIG. 3A.

A division operation is described next in connection with FIGS. 5A–5F in which the value of 331.2 is divided by 27.6. Referring to FIG. 5A, the dividend value of 331.2 is entered into the lower dials 184 and is transferred to the product-dividend register 225 (FIG. 5B) by rotating the handcrank once. It will be noted that the L.D. 461a and the M.D.D. 312 moved three orders to the right during the entry of the value 331.2 into the storing carriage. Such movement of the decimals is the same as described in addition and multiplication.

The dividend having been entered, the upper dials 300 are cleared and also the lower dials 184 of the storing carriage are cleared. The clearance of the upper dials removes the "1" previously entered therein during the entry of the dividend. The clearance of the lower dials returns the set-up carriage four orders to the left to its initial position relative to the storing carriage and also clears out the value 331.2 standing in the lower dials. The L.D. 461a is meanwhile returned three orders to the left to its initial position. Since the M.D.D. 312 is locked at this time, the three order leftward movement of the L.D. 461a moves the U.D.D. 302 three orders to the right as seen in FIG. 5C. The divisor value of 27.6 is now entered into the storing carriage as seen in FIG. 5D. During such entry, the L.D. 461a is moved two orders to the right which movement acts through the decimal planetary to move the U.D.D. 302 two orders to the left (FIG. 5D), since the M.D.D. 312 is locked at this time.

The depression of the decimal key during the entry of 27.6 causes the locking of the L.D. 461a in the position shown in FIG. 5D and since the M.D.D. 312 previously was locked, the U.D.D. 302 is locked through the decimal planetary. It will therefore be seen that the U.D.D. 302 is located before the quotient is determined as is evident from an examination of FIGS. 5D through 5F. The last digit a "6," is now entered by depressing the number 6 value entry key, thus completing the entry of the divisor.

The divisor value 27.6 (FIG. 5D) is now subtracted from the dividend by continuous subtractive rotation of the handcrank until overdraft occurs after which a corrective plus stroke is taken. In the present case the net number of subtractive cycles is one and a "1" shows in the upper dials 300 (FIG. 5E). The storing carriage 125 is now shifted one order to the right by depressing the right shift key 315 (FIG. 1).

This shifts the storing carriage 125 one order to the right after which the divisor is repeatedly subtracted from the dividend remainder. Two subtractive cycles of operation reduces the remainder to zero and the second quotient digit "2" (FIG. 5F) is entered into the counter register 300. This completes the present problem with the correct quotient of 231.2÷27.6=12.0 being properly indicated in the counter register.

In the present description the invention has been disclosed as embodied in a calculating machine which operates in the decimal system of rotation. It will be obvious, however, that the invention is equally applicable in a machine which operates upon a different system having a radix other than ten; therefore, in the claims, the terms "decimal point" and "radix point" are used interchangeably to denote the point of delineation between whole and fractional digits regardless of the radix which is employed.

*Decimal Control Differential*

A differential gear unit is generally indicated at 450 in FIG. 9 and includes a vertical supporting shaft 470, suitably carried by the machine framework 471, 472. A sprocket 463 is fixed to a hub 464, freely mounted on shaft 470, and the teeth of the sprocket engage the perforations on the lower tape 461. The lower decimal tape 461 is an endless strip of beryllium copper having notches cut therein to receive the teeth of sprocket 463, and this tape also rotates around a pulley 462 (FIG. 8).

A bevel gear 465 (FIG. 9) is also fixed to hub 464 and is therefore rotated by movement of the lower tape 461. A toothed disc 466, also fixed to hub 464, is engageable by a lock lever described hereinafter to lock the disc and prevent movement of sprocket 463 and tape 461.

A second bevel gear 467 (FIGS. 9 and 10) meshes with bevel gear 465 and has a hub 468 which is freely mounted on a stub shaft 469. The right end of shaft 469 lies in a seat 476a (FIG. 10) which is formed in a hub 476, freely mounted on shaft 470. The leftmost end of shaft 469 lies within a slot 477 (FIG. 9) formed in sprocket 455. The slot 477 is a continuation of a large opening 478 (FIG. 10) cut in the sprocket 455 to admit the bevel gear 467. The sprocket 455 is freely mounted on the above mentioned hub 476 which receives the stub shaft 469, a small portion of the gear 455 being cut away at the hub to permit the right end of shaft 469 to enter the hub.

A pair of flat discs 481 and 482 are mounted on either of sprocket 455 and hold the stub shaft 469 within the sprocket. The discs 481 and 482 are riveted together as at 483, and the rivets are also fixed to a toothed lock disc 484 (FIG. 9), referred to hereinafter. The three discs 481, 482 and 484 have respective apertures 813 (FIG. 10) cut therein to provide clearance for the bevel gear 467. The teeth of sprocket 455 engage in perforations in the middle decimal tape 451 and are rotatable thereby, thus revolving the stub shaft 469 and the bevel gear 467 about shaft 470. The teeth of sprocket 455 also engage in perforations in an auxiliary tape 505, referred to below.

A third bevel gear 486 (FIG. 9) is fixed to an elongated sleeve 487, freely mounted on shaft 470, and gear 486 meshes with bevel gear 467. A sprocket 460 and a gear 995 are fixed to sleeve 487. Sprocket 460 meshes with perforations in the upper decimal tape 456 and drives the same. Gear 995 forms a portion of a lost motion drive, to a gear 1005. For present purposes it can be assumed that gear 995 is directly connected through gearing (not shown in FIG. 9) to the gear 1005. This gear is fixed to a hub 1008 which also carries a sprocket 752. The latter drives a decimal control tape 480, described hereinafter, it being sufficient to note that the upper decimal display tape 456 and the upper control tape 480 normally move together as an integral unit.

From the foregoing description it is seen that the three sprockets 463, 455 and 460 (FIG. 9) form three respective drive input and output gears of the differential gearing 450. The ratios of these sprockets together with bevel gears 465, 467 and 486 have been so chosen that if any one of the sprockets is held fixed while a second sprocket is rotated, the third sprocket will be driven an equal amount.

Sprockets 463, 455 and 460 either drive, or are driven by the decimal tapes 461, 451 and 456, respectively. A control element, comprising a pair of opposed ears 492 (FIG. 8) projects from members 493 and 494 which are fixed to the lower tape 461. Element 492 is urged by springs 495 toward the right and normally engages a bracket 496 on the single order selection set-up carriage 120. In this manner, the lower tape 461 normally follows and is moved by the shifting movement of the set-up carriage. The tape 461, in turn, rotates the sprocket 463

17

(FIG. 9) of the differential and therefore advances sprocket 455 or sprocket 460 depending on which of these two sprockets is locked and which sprocket is free to rotate. With the entire machine in its initial cleared condition, the upper decimal tape 456 is locked, whereas the lower tape 461 and the middle tape 451 are unlocked from the frame of the machine. Thus, during rightward shifting movement of the set-up carriage in entering a value into the selection storing carriage, the lower tape follows the set-up carriage, and through movement imparted to the differential unit 450, the middle decimal tape is shifted a number of orders to the right corresponding to the number of ordinal values entered in the storing carriage. When the decimal key is depressed, however, the lower tape 461 is locked to the framework of the machine, the upper tape 456 is unlocked, and the middle tape 451 is locked to the storing carriage, all as is disclosed hereinafter. With this condition, any shifting movement of the storing carriage acts through the middle tape 451 and the differential unit 450 to shift the upper decimal tape 456 a corresponding number of orders and in the same direction as the storing carriage is shifted. This is but one example of the many ways in which the three tapes and the differential unit are operated.

The middle decimal tape 451 (FIGS. 9 and 10) is an endless loop being supported by sprocket 455 (FIG. 8) and three pulleys 452, 453 and 454, freely mounted upon suitable supports fixed to the framework of the machine. Between rollers 453 and 454, the middle tape bears a mark of distinguishing color, as previously mentioned, and which mark may be seen through the holes 308 (FIG. 1) provided in the cover directly beneath the middle dials.

It was previously mentioned that the middle decimal tape 451 may be connected to the storing carriage or it may be locked to the framework of the machine. Taking the latter condition first, the middle decimal tape is locked to the framework by moving a lever 501 (FIG. 11) counterclockwise into engagement with the locking disc 484 (see also FIG. 10) which is integral with sprocket 455. Such locking of the middle tape occurs under the control of various mechanisms described hereinafter.

Referring now the locking of the middle tape 451 to the storing carriage, such connection is effected not directly to tape 451, but through the intermediary of a middle decimal control tape 505 (FIG. 8). The tape 505 is perforated like the middle indicator tape 451 and is engaged by the same sprocket 455 that engages tape 451. From there, however, the control tape 505 follows a different path than tape 451 in that it travels from sprocket 455 about pulleys 452 and 506 and then back to sprocket 455. Between pulley 506 and sprocket 455, the control tape 505 carries a pin 318 for selectively connecting the control tape 505 to the storing carriage. Pin 318 is mounted in a carrier 508, fixed to the tape 505. Pin 318 includes a ball joint which is enclosed in the carrier 508 for limited up and down rocking movement of pin 318 relative to the tape to permit engagement and disengagement of the forward end of pin 318 with the teeth of a rack 509 (FIG. 11) fixed to an extension 510 of the selection storing carriage. The mechanism for controlling the rocking movement of the control pin 318 is described later.

The upper decimal indicating tape 456 is mounted for movement relative to the holes 511 (FIG. 1) of the machine cover by means of the sprocket 460 (FIG. 9) and three pulleys 457, 458 and 459 (FIG. 8). During the calculating and shifting operations, the upper decimal tape is driven by sprocket 460 of the differential 450, when either the lower decimal tape or the middle decimal tape is moved, as explained hereinbefore. During clearance of the middle dials, the upper decimal tape 456 is returned to its initial position, as explained hereinafter.

18

Lower Dial Decimal Indicator

The lower dial decimal indicator 322 (FIGS. 1 and 11) comprises a spot of contrasting color carried on an upstanding member 565 (FIG. 11). The latter has transversely bent ears which are freely mounted on a pair of guide shafts 566 and 567, and is under tension of a spring (not shown) which constantly urges the decimal member 565 toward the right of the machine.

A lever 569 is pivotally mounted on shaft 567 and a pawl 570 is pivotally mounted at 571 on the lever 569. A toggle spring, shown in dotted lines and connected at 566 and 573, normally holds lever 570 in its extreme clockwise position where it rests on shaft 567 and in which position the rightmost end of lever 570 lies in a plane adjacent the upper end of the set-up carriage frame 568. With this condition of the parts, the decimal member 565 is urged against the set-up carriage frame 568 and during the entry of a value into the storing carriage, the decimal member follows the set-up carriage for each digit so entered.

The depression of the decimal key causes a bail 572, integral therewith, to move downwardly, and through engagement with a bifurcated tip on lever 569, the latter is rocked in a counterclockwise direction about the shaft 567. At such time, the pivot 571 is moved downwardly in a counterclockwise direction, and when the anchor 573 for the toggle spring on lever 570 is moved sufficiently to the left, it exerts a toggle action on lever 570 and moves the same counterclockwise about its pivot 571. This moves the rightward end of lever 570 into engagement between a respective pair of ordinally arranged teeth 574 on a rack suitably fixed to the storing carriage. This locks the decimal indicator 322 relative to the factor indicator dials 184. This relationship is maintained until the decimal key is raised during certain clearance operations noted hereinafter. The raising of the decimal key and bail 572 restores lever 570 to the position.

Add-Subtract Key and Multiply-Divide Key

The add-subtract key 306 (FIGS. 1 and 7) is used to condition the machine for single cycle operations, and the multiply-divide key 307 is used to condition for plural cycle operations. These two keys are mounted for up and down sliding movement upon respective fixed pins 989 and are spring urged upwardly by springs 990. A conventional locking slide 991 is provided to hold the keys in depressed position; depression of either key releases the other key, and an interlocking lever 992 prevents depression of both keys at the same time.

Key 306 has a transversely bent lug 670 (FIG. 13) which is embraced by the bifurcated tip of a decimal control member 669. The lug 670 is shown in FIG. 13 in the position in which it would stand when the add-subtract key 306 is raised. When key 306 is depressed, it acts through the lug 670 and member 669 to move a line 671 downwardly and thus perform a conditioning function which is fully described in the next section entitled "Decimal Key."

The multiply-divide key 307 (FIG. 7) carries a pin 993 which overlies an arm 994 fixed to a shaft 892. Depression of key 307 rocks shaft 892 (FIG. 28) counterclockwise and effects a conditioning operation, described more fully hereinafter, whereby multicyclic operations of the actuating mechanism is permitted.

Decimal Key

The depression of the decimal key 230 (FIGS. 1 and 13) performs several conditioning and operating functions which differ in accordance with whether the add-subtract key 306 or the multiply-divide key 307 stands depressed when the decimal key is depressed. During multiplying and dividing operations, the depression of the decimal key performs the following functions: (1) it locks the factor indicator decimal to the storing carriage, as previously explained; (2) it locks the lower decimal tape to the framework of the machine; (3) it locks the middle decimal tape to the storing carriage; and (4) it unlocks the upper decimal tape.

If the add-subtract key 306 (FIG. 1) stands depressed when the decimal key is depressed, the four above outlined functions are performed and in addition to these four, the following operations occur: (5) an "add" stop member is enabled to control the decimal alignment of a selected factor with a pre-determined order of the accumulator (middle dial) register; and, (6) it permits escapement of the storing carriage to the add-stop-position.

Since the decimal key must perform the many functions outlined above, assisting means are provided which are under constant spring tension tending to pull the decimal key down, and which spring means are enabled by the initial portion of the depression of the decimal key 230 (FIG. 13). The latter is fixed to a transverse bail 572 which is supported at its opposite ends by a pair of arms 576 and 577 (FIG. 16) which are mounted for limited rocking movement on a shaft 578. Arm 577 has an extension 579, and a spring 580 connected between arm 579 and a lever 581 normally holds the decimal key in the raised position shown in FIG. 16. Lever 581 is held in the raised position shown by a latch lever 582 which is pivoted to the framework of the machine at 583. A strong spring 584 urges lever 581 in a clockwise direction.

Depression of the decimal key 230 and the bail 572 first causes an ear 572a on the bail to rock latch lever 582 out from under ear 585 on lever 581 at which time the lever 581 is pulled in a clockwise direction by spring 584. A hook 586, pivotally mounted on lever 581, overlies an ear 587 on lever 577 and, therefore, this lever and the decimal key are pulled down with lever 581 to provide the power for performing the various functions outlined above and now described in detail.

The depression of the decimal key locks the lower decimal tape to the framework of the machine in the following manner. Bail 572 (FIG. 13) is embraced by a bifurcated tip on a rocking member 590 which is pivotally mounted on shaft 567. A link 591 connects member 590 and a bellcrank 592 which, in turn, has link connection 593 with an arm 594 on a shaft 499. Locking arm 498 (FIGS. 11 and 13), previously described, is fixed on shaft 499. Depression of the decimal key rocks member 590 (FIG. 13) in a counterclockwise direction and, through the above-described articulated linkage, rocks the lock lever 498 (FIGS. 11 and 13) into engagement with the toothed disc 466 which is integral with the lower decimal tape sprocket 463. This locks the lower decimal tape 461 and prevents further movement of the same.

Referring now to the second function, the locking of the middle decimal tape 451 (FIGS. 8 and 13) to the storing carriage, it will be recalled that the middle control tape 505 (FIG. 8) and the middle tape 451 are both guided around the same sprocket 455 for movement of the tapes in unison. Therefore, if the control tape 505 is locked, the middle tape 451 will also be locked. It will be recalled that a carrier comprising a pair of plates 508 is fixed to the control tape 505. Arms 318 extend beyond the tape 505. The arms project through a pair of longitudinal slots cut in a transverse tube 513 (FIG. 13A) which is of sufficient internal diameter to permit the tape to freely pass through the tube which extends across the machine.

The tube is suitably supported for limited rotation about the axis of its length, and opposite ends of the tube are fixed to similar gear segments 514, one of which is shown in FIG. 13. The gear segments mesh with respective rocking segments 515, fixed to a shaft 516. Also fixed to shaft 516 is an arm 517 having an ear 518 which lies in front of a projection 519 formed on a link 596. The latter is pivotally mounted on the previously described rocking member 590.

Depression of the decimal key acts through member 590 to move link 596 toward the left as seen in FIG. 13, thus rocking ear 518, arm 517 and the gear segments 515 in a counterclockwise direction against the urgency of a spring 712 (FIG. 19) which is fixed to an arm 713 integral with segment 515. The counterclockwise movement of segments 515 causes clockwise rocking movement of segments 514 and their integral tube 513 (FIG. 13A), thus rocking the arms 318 of the ball joint on the middle tape in a clockwise direction. The left arm 318 thus engages between adjacent ordinal teeth 509 (FIG. 13) of a rack 510 fixed to the storing carriage frame 597. In this position, arm 318 is locked to the storing carriage, and the middle decimal tape thereafter partakes of shifting movement with that carriage. Since the decimal key is held in depressed position, the link 596 will be held in its leftmost position and shoulder 519 on the link will hold ear 518 and segment 515 in clockwise position, thus maintaining the locking pin 318 in engagement with the storing carriage rack; however, under certain conditions noted hereinafter, it is necessary to hold the locking pin of the middle decimal tape in engagement with the storing carriage even though the decimal key is raised. For this reason, an auxiliary latch 714 (FIG. 19) is provided which is pivotally mounted to the framework of the machine at 715 and is spring urged in a counterclockwise direction against an ear 716 on arm 713. Thus, when segment 515 and lever 713 are rocked in a counterclockwise direction by depression of the decimal key, latch lever 714 engages ear 716 and locks the segment in its counterclockwise position even though the decimal key subsequently may be raised.

The next described function of the decimal key is the unlocking of the upper decimal tape 456 (FIG. 9). Gear 651 is integral with the upper decimal tape transport sprocket 460. A crown gear 652 (FIG. 17), fixed on a vertical shaft 653, meshes with gear 651. A small gear 654 is fixed to the bottom of shaft 653 and meshes with a large gear 655 (see also FIG. 18) which is freely mounted on a fixed shaft 656.

Gear 655 carries a pin 657 which is normally held in the position shown by a lock lever 658. The latter is pivotally mounted to the framework of the machine at 659 and is urged in a counterclockwise direction by a spring 660; however, a latch 661 (FIGS. 17 and 18) which is pivoted at 662, normally holds the lock lever 658 in the position shown. Thus, with gear 655 held locked, gear 654, shaft 653, gear 652 and gear 651 of the upper tape transport gearing are also held locked.

This condition prevails until the decimal key is depressed. It will be recalled that depression of the decimal key 230 (FIG. 13) rocks shaft 499 in a counterclockwise direction. An arm 663 (FIG. 17) is fixed on shaft 499, and has an ear 664 which lies adjacent a shoulder 665 on latch lever 661. Thus, depression of the decimal key and counterclockwise rocking of arm 663 causes ear 664 to move lever 661 in a clockwise direction and release lever 658 to the urgency of its spring 660 (FIG. 18). The lever 658 then rocks counterclockwise and releases pin 657, thereby unlocking the upper decimal tape. This completes the operations performed by the decimal key during multiplying and dividing operations, i.e., the decimal key (1) locks the decimal of the factor indicator in its current position, (2) it locks the lower decimal tape to the framework of the machine, (3) it locks the middle decimal tape to the storing carriage and (4) it unlocks the upper decimal tape.

This condition of the machine is schematically illustrated in FIG. 4A. The multiplicand value 151 has been entered into the storing carriage and the decimal key has been depressed. In multiplication (and also division) operations, the depression of the decimal key does not release the storing carriage 125 for escapement toward the right as in addition and subtraction, described below, but instead the carriage 125 remains in the position shown and thereafter either one of two things may occur: (1) if the multiplicand is an integral value such as the value 151 illustrated, then the next step is to rotate the handcrank a number of times corresponding to the value of the first multiplier digit which is a "2." However, if the multiplicand contained fractional values such as 151.67, for example, then the value entry keys "6" and "7" would be depressed after depression of the decimal key to enter the fractional value ".67". The handcrank is then rotated a number of times corresponding to the first multiplier digit. Thereafter, the multiplicand in the storing carriage is shifted by shift keys described hereinafter and the handcrank is rotated in successive orders the requisite number of times to complete the multiplying operation in the manner previously outlined.

If the add-subtract key 306 (FIG. 1) stands depressed when the decimal key is depressed, the four above mentioned functions are carried out, and in addition to these four functions, the depression of the decimal key also: (5) enables an "add" stop member which controls the decimal alignment of a value standing in the storing carriage with a predetermined order of the accumulator register, and (6) it permits escapement of the storing carriage to the add-stop position.

Referring first to the enabling of the add-stop, the decimal key lever 576 (FIG. 13) carries a pin 668 which is embraced by a slot in the right end of a lever 669. A similar slot in the left end of lever 669 embraces an ear 670 on the add key stem. Ear 670 is shown in its raised position, but when the add key is depressed, ear 670 is moved downwardly, thus rocking the lever 669 about the pin 668 which acts as a fulcrum. At such time, a link 671, pivoted to lever 669 is moved downwardly to the extent that the upper end of a slot 672 rests on a stud 673. The latter is carried by an arm 674 fixed on shaft 675. With this condition of the parts, the depression of the decimal key 230 acts through pin 668 to rock lever 669 clockwise about ear 670, thus moving link 671 downwardly, and through impingement upon pin 673, rocks arm 674 and shaft 675 in a counterclockwise direction.

A lever 676 is also fixed on shaft 675, and a link 677 (FIG. 19) is pivotally mounted on the upper end of lever 676. A stud 682 supports the bottom side of the link. The rightmost end of link 677 has an inverted U-shaped end which embraces an ear 678 of another link 679. The latter is supported for endwise sliding movement by a fixed pin 680 which engages within a slot 681 in a link 679. The rightmost end of link 679 is supported for limited up and down and also endwise movement as follows. A pin 683 in the right end of link 679 projects through a pair of slots 684 and 685 (FIG. 13) in respective links 686 and 687 which are urged in opposite directions by a spring 688, the arrangement being that pin 683 is embraced by the top of slot 685 and by the bottom of slot 684. The bottom ends of links 686 and 687 have a similar pin and slot connection with a pin 689 on a lever 690. The latter is fixed to shaft 502. Spring 688 holds link 687 in its lowermost position, and therefore pin 683 and link 679 normally stands in the position shown in FIG. 19. In this position a shoulder 691 on the link 679 stands adjacent an ear 692 carried by an arm integral with an add-stop arm 317. The latter normally stands in a position out of the path of movement of the locking pin 318 on the middle decimal control tape 505, but upon depression of the decimal key and the resulting counterclockwise movement of lever 676 (FIG. 19), links 677 and 679 are moved to the left and shoulder 691 rocks the ear 692 and the add-stop 317 in a clockwise direction. In this position, the add-stop 317 lies in the plane of movement of the right end of pin 318, and in which position it is held until the decimal key is returned to its initial raised position.

It will be recalled that as the value keys are depressed to enter a value into the storing carriage, the middle control tape 505 is moved with the lower decimal tape, order by order, toward the right of the machine for each ordinal entry made. Thus, at the time the decimal key is depressed, the pin 318 stands in a position which is representative of the factor decimal point. Therefore, this pin is used in combination with the add-stop 317 for determining how many orders of shifting movement are necessary to align the selected factor decimal with the predetermined decimal position 308 (FIG. 1).

In the initial position of the parts, the upper end of a lock lever 402 (FIGS. 6 and 20) stands adjacent an extension 401 of the storing carriage 125 and prevents rightward movement of the same. Upon depression of the decimal key, and simultaneously with the above described movement of the add-stop 317, the storing carriage is released for spring urged movement toward the right. For this purpose, a hook 695 (FIG. 19) is pivotally mounted at 696 to the previously described link 679 which is moved toward the left by the depression of the decimal key. Hook 695 is spaced apart from and underlies an ear 697 (see also FIG. 20) on the lock lever 402, and the total movement of link 679 and hook 695 is sufficient to rock the lock lever 402 counterclockwise out of restraining engagement with the storing carriage extension 401. This releases the storing carriage 125 (FIG. 6) for rightward shifting movement under the urgency of spring 403 as previously described, and such shifting continues until the pin 318 (FIG. 19) contacts the add-stop 317 and stops further shifting movement.

This completes the operations performed by the depression of the decimal key at which time the storing carriage 125 stands in the shifted position schematically illustrated in FIG. 3C. It will be noted that the pin 318 stands adjacent the add-stop 317 and that the middle decimal indicator 312 stands to the left of the eighth rightmost order of the middle dials 225, such position having been chosen for the location of the decimal indicator in all add or subtract problems by the fixed location of the add-stop 318. This location permits the entry of eight fractional digits to the right of the selected decimal location, or the entry of eight integral digits to the left of the decimal, the leftmost order of the seventeen order middle dials 225 being provided as an "overflow" order.

With the machine being in the condition illustrated in FIG. 3C, the handcrank is rotated once to enter the selected value "125" into the middle dials and to restore the set-up carriage and the storing carriage to their leftmost initial positions. Also, the rotation of the handcrank, in problems of addition and subtraction, clears out the value "125" from the storing carriage and returns the factor decimal indicator 322 to its initial leftmost position. The manner in which the value "125" is entered into the middle dials 225 has been described in connection with the digital actuating mechanism and is not described here again; the restoration of the set-up and storing carriages is described rated under the heading of "Clearance Mechanism." It should be noted, however, that a clearance operation of the lower dials is automatically carried out by the handcrank during each addition or subtraction operation in the same manner as if the lower dial clear key had been depressed.

The rotation of the handcrank also: (1) raises the decimal key to its initial position, thus unlocking the middle decimal control tape from the storing carriage, and (2) locking the middle decimal control tape to the framework of the machine. This locks the middle dial decimal indicator 312 in its current position of display.

The decimal key is raised to its initial position by means of the wide cam 544 (FIGS. 15 and 16) which, as previously described, is rotated once for each rotation of the handcrank during problems of addition and subtraction. Bellcrank follower 701 (FIG. 16) is pivotally mounted at 702 and carries a roller 703 which rides on the cam 544. A pin 704, carried by bellcrank 701 underlies an arm 705 of a lever 706 pivoted on the framework of the machine at 707. Upon rotation of cam 544 in either direction, follower 701 is rocked in a clockwise direction and pin 704 rocks lever 706 in a counterclockwise direction. At such time an ear 708 on lever 706 describes an arc which normally underlies the tail 709 of latch lever 586; it will be recalled however, that upon depression of the decimal key 230 and the disabling of latch lever 582, the strong spring 584 is enabled to pull lever 581 in a clockwise direction, and through latch lever 586, holds the divide lever 577 in depressed position, as shown in FIG. 22. In the depressed position of the parts, lever 709 stands in the plane of movement of ear 708 on lever 706, and during counterclockwise movement of the lever 706 by cam 544, ear 708 rocks lever 709 and its integral latch 586 in a counterclockwise direction about the pivot 710 on lever 581. This disconnects latch lever 586 from the decimal key lever 577 which responds to spring 580 and returns to its initial raised position. In this manner, the decimal key is returned to its initial position by spring power in the early part of the handcrank cycle even though the auxiliary lever 581 is retained in its lower position by spring 584. Then later, in the cycle of rotation of cam 544, the pin 704 on bellcrank 701 engages the underside of lever 581 and returns the same to the initial position of the parts as shown in FIG. 16, thus reestablishing the latched connection between latch lever 586 and the decimal lever 577, and also the connection between latch lever 582 and the auxiliary lever 581. The foregoing arrangement provides the spring means 584 for pulling the decimal key to fully depressed position and also a spring means 580 for returning the decimal key to raised position. The respective spring means and associated mechanisms for assisting in pulling down the decimal key and subsequently returning it to a raised position forms the subject matter of a divisional U.S. Patent application, S.N. 774,502, filed Nov. 17, 1958 by Eugene E. Reynolds, one of the joint inventors of the present application.

It is necessary to raise the decimal key early in the handcrank cycle, during problems of addition and subtraction so as to unlock the middle decimal tape from the storing carriage before the latter is returned to its initial position, and furthermore to permit the locking of the middle decimal tape to the framework of the machine so as to maintain the decimal position of the value entered in the middle dials.

There is a time interval between the raising of the decimal key and the locking of the middle decimal tape to the framework of the machine and during this time interval the lower decimal tape is returned to its initial position, as described hereinafter. Therefore, if means were not provided for holding the middle decimal tape during such return of the lower tape, the middle tape could move out of its proper decimal indicating position.

It was previously mentioned that the latch lever 714 (FIG. 19) holds segment 515 in counterclockwise position and therefore holds the middle tape pin 318 in locked relationship with the storing carriage rack 509 (FIG. 13) even though the decimal key is subsequently raised. Latch lever 714 (FIG. 19) is moved out of locking relation with ear 716 after the middle decimal tape is locked to the framework of the machine as is now described.

The middle decimal lock lever 501 (FIGS. 11 and 22) is fixed to a shaft 502 to which is also fixed an arm 720 (FIG. 22). The latter is under constant spring tension tending to rock the lever 501 into engagement with the notched disc 484 which is integral with the middle decimal tape transport sprocket 455; however, a pair of independent latch levers 721 and 722, pivotally mounted to the machine framework at 724 and spring urged in a counterclockwise direction, normally engage an ear 723 on lock lever 501. The locking surface of lever 721 is spaced apart from lever 722 and the latter alone prevents lever 501 from engaging the disc 484. The latch levers 721 and 722 are disengaged from ear 723 by respective means which are responsive to: (1) the rotation of the main actuator drive shaft 210, and (2) the lower dial clearance mechanism. The main actuator drive shaft 210 is rotated once for each cycle of numeral wheel actuation and carries a cam 725 for rotation therewith. A cam follower 726, pivotally mounted at 727 has link connection 728 with latching lever 722. During the first cycle of numeral wheel actuation the cam 725 rocks follower 726 clockwise and through link 728 rocks latching lever 722 in a clockwise direction, thus permitting the lock lever 501 to move counterclockwise a slight amount into engagement with latching lever 721. This slight movement of lock lever 501 prevents the latch lever 722 from reengaging ear 723.

This leaves the middle dial tape lock lever 501 under the sole control of latch lever 721. The latter is rocked clockwise to release the lock lever 501 during every lower dial clearance operation. Such clearance occurs automatically during the latter part of each rotation of the handcrank in add-subtract operations. During lower dial clearance a lever 904 (FIG. 23) is rocked in a clockwise direction and then returned to its initial position as explained hereinafter. A hook 732, pivoted to lever 731, lies adjacent an ear 734 (FIG. 22) on latch lever 721 and moves the same in a clockwise direction thus releasing the lock lever 501. The latter engages the toothed disc 484 and thus locks the integral sprocket 455 for the middle decimal tape to the framework of the machine. Near the end of the forward (leftward) movement of hook 732 (FIG. 23), a camming surface 735 on the hook contacts a fixed pin 736, thus disengaging hook 732 from ear 734 to release the lock lever 721.

When lock lever 501 (FIG. 22) rocks counter clockwise to engage disc 484, as mentioned above, a tail 738 on the lever contacts a pin 739 on a lever 740, which is freely pivoted on shaft 502, and rocks the lever 740 in a counterclockwise direction. A pin 741 on lever 740 overlies latch lever 714 and rocks the same out of restraining engagement with ear 716. This releases arm 713 (FIG. 19) and segment 515 for return clockwise movement to the position shown in FIG. 19, at which time segment 515 rotates segment 514 and sleeve 513 (FIG. 13A) in a counterclockwise direction, thus moving the middle decimal tape control pin 318 out of locking relation with the storing carriage rack 509.

When the lock lever 501 rocks counterclockwise to lock the middle decimal tape, it automatically unlocks the upper decimal tape. For this purpose, an ear 1010 (FIG. 13), on an arm integral with lever 501, overlies an extension 1011 (FIG. 17) on the upper decimal lock lever 661. Upon counterclockwise movement of lever 501, ear 1010 depresses extension 1011 and rocks lever 661 clockwise to unlock the upper decimal tape, as previously described.

From the foregoing, it is seen that the rotation of the handcrank unlocks the middle decimal control tape from the storing carriage and locks it to the framework by means of lock lever 501 (FIG. 22) and disc 466. At the same time, the upper decimal tape is unlocked.

Meanwhile, the raising of the decimal key to its initial position by the rotation of the handcrank returns the add-stop 317 (FIG. 19) to its initial counterclockwise position. For this purpose, the link 679, which is returned to its rightmost position by the rise of the decimal key, carries an elongated shoulder 744. This shoulder contacts ear 692 on the add-stop 317 and rocks the same in a counterclockwise direction to its initial position.

Meanwhile, the above described rocking of the lock lever 501 in a counterclockwise direction to engage and lock the middle decimal disc 484 causes the arm 690 (FIG. 13), integral with the lever 501, to rock a similar amount in a counterclockwise direction. At such time pin 689 moves links 686 and 687 upwardly as a unit, thus raising pin 683 and link 679 (FIG. 19) to the extent that shoulder 691 on link 679 is moved above the ear 692 on the add-stop 315. Such upward movement of link 679 also moves a shoulder 746 adjacent an ear 747 which forms a portion of the "floating add-stop" mechanism described below. With shoulder 691 above ear 692 on the add-stop and with shoulder 746 lying adjacent the ear 747, means are conditioned whereby the subsequent depression of the decimal key and the resultant leftward movement of link 679 will cause shoulder 746 to rock ear 747 in a clockwise direction. Ear 747 is fixed on a disc 748 similar to segment 514 except that it has no gear teeth thereon. A spring 1012 normally holds disc 748 in the counterclockwise position shown.

A split tube 749 is fixed to the disc 748 and a similar disc (not shown) is fixed on the other end of the tube to hold the two tube portions in spaced relationship to each other. The split tube is rotatably mounted within the framework of the machine by suitable means not shown, and controls the rocking movement of a "floating add-stop" or control pin 303. The latter is fixed on an upper decimal control tape 480 in the same manner that the locking pin 318 is fixed on the middle decimal control tape 505, and is provided to control the decimal alignment of an augend or subtrahend value with the first value entered in the middle dials.

The upper decimal tape control 480 is driven by a sprocket 752 which is connected (by means described hereinafter) to the upper decimal display tape 456 so that the two tapes move in unison. Thus, the control pin 303 is located in an ordinal position which is representative of the ordinal location of the upper dial decimal indicator.

In review then with the rotation of the handcrank completed, the decimal key is raised to initial position, and the selected value is entered into the middle dials 234 (FIG. 1) in correct decimal relationship to the decimal indicator 312 which is in the position indicated at 308. Furthermore, the rotation of the handcrank returns the selection storing carriage 125 to its initial position shown and clears the display dials to "blank" indicating position, thus placing the machine in condition for the operator to enter the second factor of the addition or subtraction problem. The plus-minus conditioning key 306 remains in depressed position throughout all operations until it is raised by the depression of the multiply-divide key 307.

Reverting now to the decimal key and related decimal control functions, it will be recalled that when the value "125" was first entered into the storing carriage as shown in FIG. 3B, the set-up carriage 120 (FIG. 8) moved three orders to the right in effecting such entry at which time the spring-urged ears 492 on the lower tape 461 followed the set-up carriages, thus moving the lower tape 461 three orders to the right. Such movement of the tape is schematically illustrated by the three order movement of reference lug 461a shown in FIGS. 3A and 3B. After entry of the value "125," the depression of the decimal key locked the lower decimal tape 461 in this third ordinal shifted position before the storing carriage was released for rightward shifting movement. Since the decimal key also locked the middle control tape pin 318 (FIG. 13A) to the storing carriage and then shifted the storing carriage and pin 318 five orders to the right, the tape differential 450 (FIG. 9) moved the upper decimal tape 456 and its indicator 302 (FIG. 3C) five orders to the right (compare FIGS. 3B and 3C).

Then when the handcrank was rotated, the middle decimal indicator 312 was locked in the position shown in FIGS. 3C and 3D, and the storing carriage and the set-up carriage were returned to their initial leftmost positions. During such return the set-up carriage 120 (FIG. 8) picked up the lower decimal tape ears 492 and returned the lower tape 461a (FIGS. 3C and 3D) three orders to the left to its initial position. Since the middle dial decimal tape 451 was locked prior to the three order return movement of the lower tape 461, the upper dial decimal tape and its decimal indicator 302 were moved three orders to the right from the position shown in FIG. 3C to that shown in FIG. 3D. The upper decimal control tape and its control pin 303 also moved three orders with the upper decimal tape. Also the rotation of the handcrank moved link 679 to its upper position to thereby enable the control pin 303 for control of subsequent shifting of the storing carriage.

With the parts in the condition shown in FIG. 3D, the value "23" is entered into the storing carriage. This moves the lower tape control pin 318 two orders to the right as shown in FIG. 3E, and since the middle decimal indicator 312 is locked at this time, the upper decimal 302 and the control pin 303 are moved two orders to the left as shown in FIG. 3E.

The decimal key is now depressed which locks the lower decimal control tape 461a and therefore locks the upper decimal 302 (through the decimal planetary gearing). The depression of the decimal key also releases the storing carriage 125 for rightward shifting movement and simultaneously rocks the control pin 303 into the path of a lug 325 (FIGS. 13 and 19) on the storing carriage. When the lug contacts the control pin the shifting of the storing carriage is stopped with the decimal indicator 322 (FIG. 3F) in alignment with the middle dial decimal indicator 312.

The mechanism whereby the depression of the decimal key rocks the control pin 303 (FIG. 19) includes the link 679 which is moved to the left by depression of the decimal key. It will be recalled that the link 679 is held in a raised position at this time with shoulder 746 lying adjacent the ear 747 on disc 748. Therefore, the depression of the decimal key, in this case, rocks disc 748 and the split tube 749 in a clockwise direction thus moving the pin 303 in a similar direction into the path of movement of the lug 325 on the storing carriage. A pair of racks 755 are fixed to the framework of the machine by means not shown, and have ordinal notches cut therein to receive the opposite ends of the pin 303 as long as it stands in clockwise rocked position thus holding the pin rigid so that the pin may stop the shifting of the storing carriage without damage to the pin or to the upper decimal control tape.

Upon rotation of the handcrank, the value "23" is added to the previous value of "125" to produce a total of "148" as shown in FIG. 3G and, with one exception, the handcrank also performs the various functions described in connection with the entry of the first value of "125." Since the floating add-stop control pin 303 was used during the entry of the second value "23" to stop the shifting of the storing carriage, instead of the fixed add-stop 317 which was used during the entry of the first value "125," the control pin 303 must be returned to its initial position by the rise of the decimal key.

It will be recalled that link 679 (FIG. 19) was moved to an upper position when the middle decimal tape was locked, and remained in this position where it was in position to move the control pin 303 to effective position upon subsequent depression of the decimal key; therefore, when the decimal key is raised to its initial position during the entry of the value "23" by the handcrank, the control pin 303 is returned to its initial counterclockwise position out of engagement with racks 755. This is accomplished by a shoulder 756 on link 679 which contacts ear 747 and moves the same in a counterclockwise direction.

Thus with the parts returned to the initial positions by the rotation of the handcrank as described above, the machine is in condition to receive the next value, if any, and the sequence of operations in all subsequent add or subtract operations is the same as described for the entry of the second value of "23."

From the foregoing description, it will be evident that all the values of a series of add and subtract operations are entered into the middle dials around a fixed decimal position. During the entry of the first value, the decimal alignment of the selected value with the fixed position is under the joint control of the pin 318 (FIGS. 3A–3C) and the fixed add-stop 317. Thereafter the decimal alignment of other selected values with the fixed decimal position in the middle dials is under the joint control of the lug 325 (FIGS. 3D–3F) on the storing carriage, and the differential planetary system as represented by the shifting control element 303 on the upper decimal control tape.

This type of decimal alignment control applies only to problems of addition and subtraction. During multiplication and division operations, the decimal mechanism operates under the joint control of the decimal planetary mechanism and the shift keys, the latter now being described first.

Right Shift Key

The right shift key 315 (FIGS. 19 and 20) is moved rearwardly to cause the following operations:

(1) it depresses the decimal key if the latter is not already depressed;
(2) it releases the storing carriage from the end position latch to permit a one order escapement of the same;
(3) it operates a single step escapement mechanism to cause a one order shift of the storing carriage to the right;
(4) it restores the add-stop or the floating add-stop to its respective normal disabled position in case either one stands in enabled position when the shift key is depressed; and
(5) it disconnects the linkage from the decimal key to the add-stop and the floating add-stop enabling mechanism.

Since the shift key normally is not used in addition and subtraction operations, it will be assumed that the multiply-divide key 307 stands depressed when the shift key is depressed, and that the operator is performing a multiplication operation. In this case, the multiplicand is entered into the storing carriage by depressing the value entry keys 100—109 and the decimal key 230 in the same order as one would write the multiplicand on paper and this value is displayed in the indicator dials 184 in the same way that an addend or subtrahend is displayed therein; however, since the multiply-divide key 307 is depressed, the depression of the decimal key 230 does not cause a shifting movement of the storing carriage as described in connection with add-subtract operations. Referring to FIG. 13, it will be seen that the lug 670, which is on the add-subtract key, is in raised position when the multiply-divide key is depressed, thus holding lever 669 in the raised position shown. This holds link 671 in raised position with the top of slot 672 being raised above pin 673. Therefore, when the decimal key 230 is depressed and lowers link 671, the top of slot 672 merely comes to rest on top of pin 673 and does not move the same to release the storing carriage from the end latch. Thus, the storing carriage 125 (FIG. 1) remains in its leftmost position throughout the entry of the multiplicand value into the storing carriage 125.

Since the machine normally stands with all registers in a cleared condition at the time the multiplicand is entered into the storing carriage, the decimal indicating mechanism operates in the same manner as described in connection with the entry of an addend, i.e., the U.D.D. 302 (FIG. 4A) is locked in the starting position shown and, therefore, the entry of the multiplicand value "151" moves the L.D. 461a three orders to the right and also acts through the decimal differential to move the M.D.D. 312 three orders to the right.

The handcrank is then rotated a number of times corresponding to the value of the first multiplier digit "2" (FIG. 4B) and the product of 2×151=302 appears in the middle dials and the multiplier value of "2" appears in the upper dials.

The shift key is now moved rearwardly and performs the functions outlined above and now described in detail.

(1) The shift key depresses the decimal key if the latter has not already been depressed. (The operator would not need to depress the decimal key during the entry of a whole multiplicand value; however, the decimal key must be depressed prior to the actual shift operation to cause correct operation of the decimal indicating mechanism.)

The shift key 315 (FIG. 19) is fixed on a keystem 801 which is pivotally mounted on a shaft 802. An arm 803 underlies an ear 804 on a lever 805 pivotally mounted on 806. Another ear 807 on lever 805 overlies a projection 808 on the decimal key lever 577 (FIG. 16). Thus, upon rocking of the shift key 315 in a clockwise direction, the tail 803 rocks lever 805 counterclockwise and ear 807 depresses the decimal key which remains depressed. The decimal key performs all of the functions previously described in connection with add-subtract operations except that it does not enable the add-stop since the add-subtract key is in raised position during multiplication operations, as noted above. These functions performed by the decimal key are, briefly: it unlocks the U.D.D. 302, it locks the L.D. 461a to the framework of the machine, it locks the M.D.D. 312 to the storing carriage 125, and it moves link 679 (FIG. 19) to its raised position.

(2) The next operation performed by the shift key is that it releases the storing carriage 125 (FIG. 6) from the end position latch 402. For this purpose, the right arm 810 (FIG. 19) of the shift key has an ear 811 which overlies two levers 812 and 813, pivoted at 814. The rightmost end of lever 812 has pivotal connection 815 with a link 816, part of which is broken away to show other parts of the machine. The lower end of link 816 is pivotally connected at 817 to an arm 818 which is fixed to a shaft 819. The latter also carries a second arm 820 to which is pivoted a link 821 at 822. Link 821 carries a pin 823 (see also FIG. 20) which lies adjacent the tail of the end latch 402. Upon rearward movement of the shift key 315, lever 812 is rocked in a counterclockwise direction thus moving link 816 upwardly and rocking the arms 818 and 820 in a clockwise direction. This moves link 821 toward the right and pin 823 (FIG. 21) then rocks the end latch 402 counterclockwise and releases the storing carriage.

Meanwhile, function No. 3, the operation of the storing carriage escapement mechanism, is carried out by the operation and release of the shift key, which moves shaft 819 clockwise and then returns it counterclockwise to its initial position. An arm 978 is fixed on shaft 819 and is pivotally connected to a link 979. The opposite end of the link is connected to a lever 980 (FIG. 6) which is pivotally mounted on the framework of the machine at 981. The leftmost end of lever 980 has an upturned ear 982 which normally lies in blocking relation to a hook 983 on a lever 984. The latter is urged by a spring 987 in a clockwise direction about a pivot 985. The leftmost end 986 of lever 984 is held against a pair of cam surfaces on the escapement pawls 447 and 448 (see also FIG. 20), thus holding the pawls spread apart as shown in FIG. 6 to normally permit movement of the escapement segment 425 and of the storing carriage 125. When the shift key 315 is operated however, only a single order escapement is desired, and in this case the clockwise rocking of shaft 819 (FIG. 20) acts through arm 978 and link 979 to rock the lever 980 (FIG. 6) counterclockwise out of restraining engagement with hook 983. This permits lever 984 to rock clockwise out of engagement with pawls 447 and 448 (FIG. 20) and releases the escapement pawls 447 and 448 to the control of a mechanism described in the next paragraph. Hook 983 remains disengaged from ear 982 until the storing carriage is returned to its initial position during a lower dial clearance operation. During such an operation, a bellcrank 433 is rocked in a counterclockwise direction and an ear 435 on the bellcrank contacts an ear 988 on an extension of lever 984. This rocks lever 984 clockwise to its initial position at which time ear 982 snaps back over hook 983 and holds it in the initial position shown.

Referring again to the escapement pawls 447 and 448 which are released from lever 984 when the shift key is operated, the escapement movement of these pawls is controlled as follows: A hub (not shown) is fixed on shaft 819 (FIG. 21) and a transversely bent ear 825 is fixed to the hub. The escapement pawls 447, 448 (FIGS. 6 and 20) are freely mounted on shaft 819 and each pawl has a respective extension 447a, 448a. A spring 826 is connected between depending portions 447b and 448b and when the pawls are released from lever 968 the extensions 447a and 448a engage ear 825. At the same time that shaft 819 is rocked to release the pawls from lever 968, the ear 825 is rocked clockwise, and ear 825 moves pawl 448 clockwise into the plane of movement of the rack 427. Then, upon release of the shift key, the released pawls 447 and 448 return in a counterclockwise direction, thus permitting the second half step of escapement of the storing carriage.

The fourth function mentioned in the foregoing outline of shift key operations is the restoration of the add-stop 317 (FIG. 19) or the floating add-stop pin 303 to its initial disabled position in case either stands in enabled position when the shift key is depressed. The add-stop and the floating add-stop are enabled only during problems of addition and subtraction as previously explained; however, it is possible that the operator might wish to retain a sum and accumulate therewith the product of a multiplication operation in which case he would first carry out an add operation and then depress the multiply-divide key 307 (FIG. 1) to condition the machine for the multiplication operation. Since either the add-stop or floating add-stop would be enabled when the multiply-divide key 307 was depressed, depending on the stage to which addition had progressed when key 307 was depressed, and since these stops would interfere with a shifting operation, the following mechanism is provided which is responsive to depression of the shift key to return the add or floating add-stop to disabled position.

It will be recalled that link 679 (FIG. 19) is moved to the left to enable the add-stop or the floating add-stop and the link remains in this position until the decimal key is raised. In the leftward position of link 679, the pin 683 on the right of link 679, stands in the dotted line position 683a adjacent the upper end of arm 820. Arm 820 is rocked clockwise by the shift key 315 at which time it returns pin 683 and link 679 to their rightmost positions. Shoulders 744 and 756 on link 679 thus return either the add-stop 317 or the floating add-stop pin 303 to its respective disabled position.

The fifth function performed by the shift key is the breaking of the connection between links 677 and 679 (FIG. 19) provided the add-subtract key 306 (FIG. 1) stands depressed when the shift key is operated. It will be recalled that the shift key depresses the decimal key if it is not already depressed. Such depression of the decimal key moves the top of slot 672 (FIG. 13) against pin 673, as previously described, thus rocking the arms 674 and 676 in a counterclockwise direction. Arm 676 (FIG. 19) is connected to and moves link 677 toward the left; however, the shift key, as described under (4) above pulls link 679 to the right. Therefore, if the following means were not provided to disconnect links 677 and 679, a bind would exist upon operation of the shift key. For this purpose a link 821 is pivotally connected at one end to arm 820 and is pivotally connected at its other end to a lever 828. The latter is pivotally mounted on a shaft 829 and carries a pin 830 for cooperation with a lug 831 on link 677. When link 677 is in its leftmost position, the lug lies adjacent pin 830. Upon operation of the shift key, arm 820 and link 821 rock the lever 828 and pin 830 in a clockwise direction at which time pin 830 moves lug 831 and link 677 upwardly to thus disengage the latter from ear 678 on link 679. This permits rightward movement of the link 679. When the shift key is released and returns to its initial position, the rightmost end of link 677 falls on top of ear 678 and the connection is subsequently re-established upon movement of the decimal key to its raised position which returns link 677 to its normal rightmost position.

*Decimal Shift Key*

The decimal shift key 320 (FIGS. 1 and 22) performs the same functions previously described in connection with the shift key 315 and also locks the decimal 302 for the multiplier factor which is entered in the upper register 300.

It will be recalled that after the multiplicand is entered in the storing carriage 125, the handcrank is rotated a number of times corresponding to the value of the highest, or leftmost, multiplier digit which appears in the first order to the left of the upper decimal indicator 302. After this, the right shift key 315 is operated to shift the storing carriage 125 one order to the right, the decimal indicators 302 and 312 also moving one order to the right. The next multiplier is then entered, etc., and this process is repeated until the decimal point of the multiplier factor is reached. At such time, the operator, instead of depressing the right shift key, depresses the decimal shift key. This locks the decimal indicators 302 and 312 for the multiplier and product registers in their current position and then escapes the storing carriage 125 one order to the right. Thereafter, the fractional multiplier digits are entered and the storing carriage is shifted by means of the right shift key 315.

The decimal shift key 320 (FIG. 22) is fixed on a keystem 835 which is pivoted on the shaft 802 on the left side of the right shift key 315 (shown in dotted lines for purpose of clarity). A guide pin 836 and slot 837 in the keystem act to limit the rocking movement of the key. An ear 838 on the decimal shift key overlies lever 812 and, upon rearward movement of the key, rocks the lever counterclockwise. Lever 812 then performs all of the functions previously described in connection with the right shift key 315. Similarly, a tail 839 on the decimal shift key underlies ear 804 and rocks the same counterclockwise to cause depression of the decimal key 230 in case it has not already been depressed.

Referring now to the locking of the upper and middle decimal indicators 302 and 312 by the decimal shift key, it will be recalled that the depression of the decimal key 230 locks the lower decimal tape, thus locking one leg of the differential. Therefore, if the middle decimal tape is locked by the decimal shift key, thus locking the second leg of the differential, the third leg, or the upper decimal tape, will automatically be locked.

For this purpose, the decimal shift keystem has an ear 840 (FIG. 22) which overlies a lever 841, pivotally mounted at 842. The right end of lever 841 is pivotally connected to a link 843 which is guided for up and down movement by a fixed pin 844 and a slot 845 in the link. An ear 846 on the lower end of the link underlies the left ends of both the latch levers 721 and 722 which serve to hold the middle decimal lock lever 501 in its normal "unlock" position.

Clockwise movement of the decimal shift key rocks lever 841 counterclockwise, and through link 843, rocks latch levers 721 and 722 in a clockwise direction to release the lock lever 501. The latter is spring urged in a counterclockwise direction and engages the middle decimal locking disc 484, thus locking the decimal differential and the decimal indicators 302 and 312 (FIG. 1) in their current positions. Thereafter, any subsequent shifting movement of the storing carriage 125 such as by operation of the right shift key 315 does not change the locked position of the decimal indicators.

At the same time that the decimal shift key 320 (FIG. 20) is operated, and lock lever 501 rocks counterclockwise to lock the decimal indicators 302 and 312 in their current positions, the depression of the decimal shift key also causes depression of the decimal key. This causes leftward movement of link 596 (FIG. 13) which normally acts through shoulder 519 to rock segment 515 in a counterclockwise direction and lock the middle decimal tape to the storing carriage. However, in the present case, the middle decimal tape must be locked to the framework of the machine by lever 501 and must not be locked to the storing carriage. Therefore, the arm 720 (FIG. 13), which is integral with lock lever 501, is provided with a pin 848 which overlies link 596 and depresses the link when the decimal shift key is depressed. This moves shoulder 519 on link 596 from engagement with ear 518, thus breaking the connection 518–519 and preventing the locking of the middle decimal tape to the storing carriage.

It will be apparent that the depression of the decimal key by the decimal shift key will move link 596 a certain amount toward the left before the pin 848 depresses link 596 far enough to break the connection 518–519. The segment 515 will therefore be rocked an amount which may be sufficient to lock the middle decimal tape initially to the storing carriage; however, when link 596 is depressed by 848 and shoulder 519 on the link falls below ear 518 on the segment the spring 712 (FIG. 19) will return the segment to its initial position thus unlocking the tape from the storing carriage.

*Lower Dial Clear Key*

The depression of the lower dial clear key 330 (FIGS. 1 and 25) disconnects the handcrank from the actuator drive train and connects the handcrank to a clearance drive mechanism so that rotation of the handcrank will restore the storing carriage and the set-up carriage to their initial leftmost positions, and also reset the lower dials to "blank" indicating position.

The keystem 881 (FIGS. 25 and 28) of the key 330 is mounted for up and down sliding movement upon a pair of fixed studs and is normally urged to its raised position by a spring (not shown). A latch lever 884 (FIG. 28) is pivoted at 885 and the upper end of the lever contacts a transversely bent ear 883 on the keystem 881. Depression of the key 130 moves ear 883 below the latch lever which snaps over the ear and locks the key in depressed position.

A pawl 886 is pivotally mounted on the keystem 881 at 887 and the lower end of the pawl terminates in a shoulder which overlies a pin 888 carried by a lever 889. A torsion spring (not shown) urges pawl 886 counterclockwise into engagement with pin 888. Upon depression of key 330 the lever 889 and the shaft 771 to which it is fixed are rocked clockwise. A lever 780 (FIGS. 24 and 25) is also fixed on shaft 771, and the upper end of lever 780 is connected by link 781 to a lever 782 which is loosely keyed to a shaft 783. The upper end of lever 782 has a bent ear 784 which lies adjacent a camming surface 785 on the tail of the previously mentioned yoke 524 (see also FIG. 15). Upon clockwise rocking movement of lever 782, the ear 784 rocks yoke 524 in a clockwise direction, thus disengaging the clutch element 522 from the actuator drive gear 527 and engaging the element 522 with the clearance drive gear 531. The subsequent rotation of the handcrank and shaft 521 causes rotation of gear 531 and its integral cam 559; however, in the present case, such rotation of the gear and cam is an idle rotation since the mechanisms, which gear 531 and cam 559 drive are normally disabled and are enabled only by the middle dial clear key, as is described hereinafter. The above described movement of the yoke 524, in the present instance, is for the sole purpose of disengaging the drive from the handcrank shaft 521 to the actuator drive gear 527.

The depression of the lower dial clear key is also effective through the above-described lever 782 (FIG. 24) to rock the shaft 783 and a lever 876, tightly keyed to the shaft, in a clockwise direction and position the pin 873 carried thereon in the bottom of the slot 874 (FIG. 15) of the yoke 547. If the pin 873 originally stood in the position shown in FIG. 15, then the movement of the pin to the bottom of the slot 874 does not change the relationship between the drive element 540 and the wide cam 544, the yoke 547 merely being reciprocated to the right and then back to its original position; however, if the multiply-divide key 307 (FIG. 1) stands depressed prior to the depression of the lower dial clear key, then the pin 873 will be located in the middle of slot 874, thus holding the drive member 540 in disengaged position relative to cam 544. Therefore, the subsequent depression of the lower dial clear key moves pin 873 to the lowermost position to insure that a driving connection is established between member 540 and cam 544. Cam 544 and the mechanisms driven thereby have been previously described in the section relating to "Drive Mechanism" and serve to restore the selection set-up carriage, the selection storing carriage and the factor indicator dials to their initial positions.

Means are also provided which are operative near the end of the cycle of rotation of the handcrank to release the depressed clear key from its latch. The previously mentioned cam 543 (FIGS. 15 and 24) is fixed on the shaft 539 and, by virtue of the gearing 537 and 538, is rotated whenever the handcrank is rotated.

A cam follower 934 (FIG. 24) is pivoted at 935 and has link connection 936 with a lever 937 which is freely mounted on the shaft 769. A bail 938 is carried between lever 927 and a lever (not shown) but which is similar to lever 937 and is also mounted on shaft 769. When key 330 (FIG. 28) is locked in depressed position by latch lever 884, the latter overlies ear 883 on the key and at such time stands adjacent bail 938 (FIGS. 24 and 28). Thus, upon rotation of the handcrank, the cam 543 becomes operative near the end of the cycle of rotation to release the lower dial clear key 330 from latch lever 884. This completes the lower dial clearance operation at which time the lower dials are reset to "blank" indicating position, the set-up carriage is returned to its initial leftmost position relative to the storing carriage, the storing carriage is returned to its initial leftmost position shown in FIG. 1, and the decimal key is raised to its initial position. These clearance and restore operations are the same as those which occur during addition and subtraction operations, and as previously described, the raising of the decimal key 230 (FIG. 13) returns the lower decimal tape lock lever 498 to its initial position out of locking engagement with the lower decimal tape disc 466 (FIG. 11); therefore, upon return of the set-up and storing carriages to their initial leftmost positions, the set-up carriage lug 496 (FIG. 8) will pick up the lower decimal tape control element 492 and return the lower decimal tape to its initial leftmost position.

Since the decimal planetary gearing is driven by the return of the lower decimal tape to its initial position, a drive will be transmitted to either the upper or middle decimal tape depending on which tape is locked and which tape is unlocked at this time. It will be recalled that the upper decimal tape is locked and the middle decimal tape is unlocked until the decimal key is depressed. Therefore, if the decimal key has not been depressed prior to the lower dial clearance operation, the return of the lower decimal tape to its initial leftmost position will act through the decimal planetary to return the middle decimal tape a similar number of orders to the left to its initial position. However, if the decimal key has been depressed the middle decimal tape is locked and the upper decimal tape is unlocked; therefore, the return of the lower decimal tape to its leftmost position moves the upper decimal tape a similar number of orders to the right in the same manner as described in problems of addition and subtraction.

When the lower dial clear key 330 is released for return to its raised position, lever 782 (FIG. 24) returns to the initial position shown, thus releasing yoke 524 (FIG. 15) which tends to return to its initial counterclockwise position; however, such return is blocked until the full cycle position of the clutch element 522 is reached and the pin carried thereby is aligned with the notch in gear 527. Meanwhile, shaft 583 (FIG. 24) is released to the urgency of its spring and tends to rock counterclockwise. If permitted, such movement would move pin 873 (FIG. 15) from the lowermost position to its upper or middle position, depending on where it previously stood; however, friction between pin 541 and the cam 544 prevents such return movement of the parts until the full cycle position is reached. Optionally, a second pin could be mounted on element 540 for cooperation with a hole in cam 543, which pin would prevent rightward movement of element 540 except in the full cycle position of the parts. Then, when the middle or upper dial clear keys are depressed and element 540 is disengaged from cam 544, as described hereinafter, element 540 would be engaged with cam 543. This would present no problem however, since the cam 543 is fixed on shaft 539 and rotates with shaft 539 anyway. In this case, the engagement of element 540 and cam 543 for rotation together would merely be an idle operation.

*Middle Dial Clear Key*

The depression of the middle dial clear key 331 (FIG. 24) conditions various mechanisms whereby rotation of the handcrank resets the middle dial numeral wheels to zero registration and performs other normalizing functions. First, the conditioning functions performed by the depression of the key will be described, followed by a description of the operations carried out by the rotation of the handcrank.

The conditioning functions include:

(1) locking the middle dial clear key in depressed position.

(2) disengaging the drive from the handcrank to the actuator shaft 210.

(3) disengaging the drive from the handcrank to the clearance drive cam 544.

(4) enabling the storing carriage restore mechanism, and (5) enabling a mechanism for returning the middle dials to zero registrations.

The middle dial clear key 331 (FIGS. 24 and 25) is mounted for up and down sliding movement on fixed pins 761 and 762 and is urged upwardly by a spring not shown. A lock lever 768 (FIG. 24), pivotally mounted at 769, is spring urged in a clockwise direction into contact with an ear 770 on the bottom of the keystem. Upon depression of the key, the lock lever snaps over ear 770 to hold the key in depressed position. A live tip 763 is pivotally mounted at 64 to the stem of key 331 and is urged in a counterclockwise direction by a torsion spring, not shown. A notch in the bottom of the live tip normally engages a pin 766 carried by a lever 767. Depression of the key 331 causes clockwise movement of the lever 767 (FIG. 25) which is freely mounted on a shaft 771 and which lever 767 has an open slot 772 engaging a pin 773. Pin 773 is carried by a lever 774, fixed to the shaft 769. A bellcrank 775 is also fixed to shaft 769 and carries a pin 776 which lies within a slot in a lever 777. The latter is freely mounted on shaft 771 and has an extension 778 which lies adjacent a pin on the previously described clutch control lever 780 (FIG. 24).

From the above description, it will be seen that depression of the middle dial clear key 331 (FIG. 25) causes clockwise rocking movement of lever 767 and counterclockwise rocking movement of lever 774 and bellcrank 775. The latter rocks the slotted lever 777 clockwise, and through ear 778, rocks the control lever 780 (FIG. 24) in a clockwise direction, thus disengaging the drive transmitting element 522 (FIG. 15) from the actuator drive gear 527 and engaging the element with the clearance drive gear 531.

Meanwhile, the clockwise movement of lever 782 (FIG. 24) picks up the keyed shaft 783 and rocks it one increment in a clockwise direction to thereby locate the pin 873 (FIG. 15) in the middle of the slot 874. This moves the yoke 547 toward the right, thus disengaging the drive element 540 from the lower dial clearance cam 544.

The above-described movement of the forks 524 and 547 enables a drive from the handcrank shaft 521 to the clearance drive gear 531 and disengages the drive to cam 544. This completes the first three conditioning functions mentioned in the outline above.

Referring now to the fourth function, the depression of the middle dial clear key conditions means whereby the rotation of the handcrank returns the storing carriage to its initial leftmost position. Depression of the key 331 (FIG. 24) rocks the lever 775 counterclockwise, as previously described, and thus moves a link 792, connected to the lever 775, toward the left. Link 797 has a slot which is engaged by a fixed pin 793 and the angle of the slot is such that leftward movement of the link also causes downward movement of the right end thereof. At such time, link 792 depresses a pin 939 which is carried by a hook 740. The latter is pivotally supported at 741 on the depending end of a cam follower 742. When the hook is depressed it engages behind a transversely bent shoulder 943 (see also FIG. 24A) on a sliding carriage 944. The latter comprises an upright portion 945 which extends upwardly through a slot 946 in a bottom frame piece 947. A pair of rollers 948 and 949 are freely mounted on the portion 945 and bear against the frame piece 947. A third roller 950 is mounted on a forwardly extending offset portion of the carriage 944, for a purpose described in the next paragraph. When hook 740 is depressed by depression of key 331 to engage behind shoulder 943 on the carriage, a connection is established whereby rotation of cam 559 is enabled to move the carriage forwardly. Cam follower 742 is rocked clockwise thus pulling the hook 740 and the carriage forwardly (to the left in FIG. 24) against the tension of spring 951. At such time, the roller 948 (FIG. 23) contacts the lever 900 and rocks it clockwise about pivot 901. Such movement of lever 900 restores the storing carriage to its initial leftmost position, as previously described.

Meanwhile, the forward movement of the carriage 944 causes roller 950 (FIG. 18) to contact arm 952 of the upper dial decimal restore lever 658 and return the same in a clockwise direction to its initial position. It will be recalled that depression of the decimal key, the shift key, or the decimal shift key, released lever 658 from latch lever 661; thereafter any movement of the upper decimal tape from its initial position is transmitted through gear 651 (FIG. 17), gear 652, shaft 653 and gear 654 to gear 655 (FIG. 18). Therefore, the pin 657 will stand rotated out of the position shown when the restore lever 658 is returned to its initial position. During such return movement the diverging sides of a slot 954 in the restore lever pick up the pin 657 and return it to its initial position thus restoring the upper decimal indicator to its initial position. At such time, the latch lever 661 (FIG. 19) normally re-engages the restore lever 658, thus locking the lever and the upper decimal tape; however, if the decimal key stands in depressed position prior to the clearance operation, then ear 664 (FIG. 17) on lever 663 stands in counterclockwise position and holds the latch lever 661 out of latching engagement with the upper decimal restore lever 658. This situation may arise if the operator enters a value in the storing carriage (including depression of the decimal key) and then decides to clear the middle dials.

In this case, the upper decimal indicator is returned to its initial leftmost position but is not locked in this position, and if the storing carriage is then shifted to the right, the upper decimal tape also shifts to the right, order by order, with the storing carriage until the decimal shift key is depressed or another middle dial clearance operation occurs.

The above-mentioned return movement of the upper decimal tape to its initial leftmost position is transmitted through the decimal tape differential gearing and returns the middle decimal tape the same number of orders toward the left. For example, if the previous operation was an add or subtract operation, then during rotation of the handcrank, the lower decimal tape was returned and held in its initial leftmost position by the set-up carriage, as previously explained; thus, with the lower tape held fixed, any movement of the upper decimal tape during a middle dial clearance operation must be transmitted to the middle tape. On the other hand, if the previous operation was a multiply or divide operation, then the depression of the decimal key (either manually, or automatically by a shift operation) locked the lower decimal tape to the framework of the machine. In this case, the return of the upper decimal tape to its initial leftmost position as a result of a clearance operation, again acts through the decimal differential to return the middle decimal tape to the left a number of orders corresponding to the movement of the upper decimal tape. In either case, the middle decimal indicator is returned to a position of alignment with the lower decimal tape.

It will be recalled, however, that the lock lever 501 (FIG. 22) engages the notched disc 484 to lock the middle tape during certain phases of addition, subtraction, multiplication and division operations. Therefore, the following means are provided which are operable early in the middle dial clearance cycle to disengage lever 501 from disc 484 and permit the above-described movement of the middle decimal tape.

The sliding carriage 945 (FIG. 24) has an upper camming surface which cooperates with roller 955 on a follower 956, freely mounted at 957. Upon forward (leftward) movement of carriage 945, the follower 956 is rocked clockwise and pulls link 958 down. If lever 501 stands in a counterclockwise locking position, then the pin 959 on lever 501 stands in the upper end of the slot in link 958 and the downward movement of the link returns the lever 501 to its initial clockwise position. The sliding carriage 945 thus unlocks the middle decimal tape before the carriage moves far enough to effect the return movement of the upper and middle decimal tapes.

The return of lever 501 to its initial clockwise position also rocks the integral lever 690 (FIG. 13) clockwise to its initial position, thus pulling down links 686 and 687 and the link 679 (FIG. 19) to their initial positions. The lowering of link 679 disables the link 679 with respect to the floating add-stop control ear 747 which is then returned by spring 1012 to its initial position, and re-enables link 679 with respect to the add-stop control ear 692. Thus, the link stands in proper position to permit the decimal key to enable the add-stop 317 in case the next operation is one of addition.

The next function performed during a middle dial clearance operation, is the resetting of the middle dials to zero registration. The following means are provided which are responsive to depression of the middle dial clear key, and the resultant engagement of the drive element 522 (FIG. 15) with gear 531, to cause clearance of the middle dials upon rotation of the handcrank.

Referring to FIG. 14, gear 531 is one of a train of gears comprising the gears 531, 533, the mutilated gear 548 and gear 550, the idler gears 551 and 552, and the gears 553 and 554 fixed on the middle and counter numeral wheel shafts 555 and 556 respectively.

The previously mentioned link 792 (FIG. 24), which is moved to the left and downwardly by depression of the middle dial clear key, carries a pin 794 which stands adjacent the lower arm 795 of a bellcrank 796. The latter is pivoted at 797 and the upper end thereof has a hook 798 which normally stands below and to the left of an ear 851 extending from a formed disc 852 (FIGS. 26 and 27). The disc is fixed on the reduced right end of the shaft 555 on which the numeral wheels 234 of the middle dial register are mounted. Shaft 555 is freely mounted in bearings in a pair of right and left end frames 852 and 853 and is prevented from partaking of endwise motion by a collar 854 and the gear 533 which are pinned to the shaft outside of the left and right frames, respectively. Shaft 555 has a key way which receives an endwise slidable clearance member 855. Ordinally spaced teeth 856 on member 855 extend above the periphery of the shaft for cooperation with lugs 857 carried by the respective numeral wheel shells. Normally, member 855 stands in the position shown with the rightmost end thereof abutting a hub 858 of a disc 859. Member 855 is urged to this rightmost position by a spring 860 on the leftmost reduced end portion of shaft 555. A spring clip 861 retains the spring on the shaft under tension against a collar 862 which abuts the left end of the member 855 and the enlarged portion of shaft 555.

Normally, the rotation of gear 533, shaft 555 and member 855 by the handcrank such as during a lower dial clearance operation, for example, does not cause a clearance operation since the teeth 856 on the member 855 lie to the right of the lugs on the numeral wheels. During a middle dial clearance operation, however, member 855 is moved endwise toward the left to align the teeth 856 with the numeral wheel lugs 857 so that during rotation of shaft 555 the teeth will pick up the lugs and return the numeral wheels to zero registration. The gear 233 which is integral with the numeral wheel, is under pressure of a spring pressed detent pawl (not shown) which normally retains the numeral wheel in its proper indicating position but permits movement of the numeral wheel during digital actuation and middle dial clearing operations.

The above-mentioned endwise movement of member 855 is accomplished as follows. Gear 553 which is fixed to shaft 555 carries a pin 863 which resides within a hole cut in the disc 859, so that rotation of the gear causes rotation of the disc. The disc 859 has three bent camming surfaces 864, 865 and 866 which stand adjacent the mating cam surfaces 867, 868 and 869 on disc 852. Disc 859 is freely mounted on shaft 855 for rotation with gear 533 and is moved toward the left, as described below to move member 855 toward the left with teeth 856 in alignment with the path of rotation of lugs 857 on the numeral wheels. Disc 852 normally rotated with disc 859 due to the mating cam surfaces on the discs; however, when hook 798 (FIGS. 24, 26 and 27) is moved into the path of ear 851 on disc 852, the disc 852 is prevented from rotating with disc 859. At such time, the cam surfaces 867, 868, 869, on stationary disc 852, cause the disc 859 to be moved toward the left, thus moving the hub 858 (FIG. 26) toward the left and moving the member 855 toward the left. It should be noted that the amount of rotation of gear 533 which is required to move disc 859 toward its leftmost position is sufficient to permit the teeth 856 to miss all of the lugs 857 on those numeral wheels which stand in zero position when the clearance operation is begun. Thus, the teeth 856 pick up all the lugs of the numeral wheels which stand at values "1" to "9" and return the numeral wheels to zero position during the rotation of shaft 555. When the shaft approaches its initial position the disc 859 moves back to the right into close contact with disc 852, and the clearance teeth 857 return to the initial position shown. It should be noted that the three respective cam surfaces of each disc are not spaced exactly 120° apart but are so spaced that the two discs can match only when they are in their respective initial positions. Obviously, only one cam surface on each disc could be used to provide the endwise movement described above, but three cam surfaces are provided to prevent possible binding of the disc 859 upon the shaft during endwise movement of the disc.

Near the end of the handcrank cycle, the cam 543 (FIG. 24) rocks the follower 934 clockwise and through link 936 rocks the clearance key release bail 938 in a counterclockwise direction, all as has been previously described in connection with lower dial clearance operations. Bail 938 spans all three of the clearance keys and effects release of these keys in the same manner. In the present case, the bail rocks the lock lever 768 counterclockwise thus releasing the middle dial clear key 331 which returns to its normal raised position. This completes the middle dial clearance operation.

Upper Dial Clear Key

The depression of the upper dial clear key 332 (FIGS. 1 and 25) conditions various mechanisms whereby subsequent rotation of the handcrank resets the upper dials to zero registration and then releases the upper dial clear key. Key 332 is mounted for up and down sliding movement on a pair of fixed pins 961 and is normally urged upwardly by a spring (not shown). The lower end of the key has an ear 962 which, upon depression of the key, is engaged by a latch lever (not shown). The latch lever is similar to the latch levers provided for the lower and middle dial clear keys and a repeated description of the same is believed unnecessary. A pawl 963 is mounted on the keystem of key 332 in a manner similar to that described for pawls 763 and 886 for the middle and lower dial clear keys, respectively. Pawl 963 overlies a pin 964 carried by a lever 965 which is freely mounted on a shaft 966. A slot 967 in lever 965 embraces a pin 968 carried by a lever 969. The latter is freely mounted on a shaft 970. Pin 968 extends through lever 969 and the rightward end of the pin overlies the tail 971 of the clutch control lever 780.

Depression of key 332 rocks lever 965 clockwise and thus rocks the pin 968 counterclockwise. The rightward end of the pin rocks the clutch control lever 780 in a clockwise direction. Such movement of lever 780, as previously described in connection with depression of the middle dial clear key, acts through link 781 (FIG. 24) and lever 782 to: (1) disconnect the drive element 522 (FIG. 15) from the actuator drive gear 527 and engage the drive element with gear 531 of the clearance drive train, and (2) rocks the clutch yoke 547 toward the right, thus disengaging the drive element 540 from the lower dial clearance control cam 544.

Meanwhile, a link 973 (FIG. 25) which is pivotally connected to lever 969 is pulled to the left by the depression of key 332. The right end of link 973 (FIG. 24) is connected to a hook lever 974 and rocks the same in a clockwise direction to the extent that the upper end of the hook lies in front of an ear 975. Ear 975 is identical to ear 851 of the middle dial clearance mechanism and since the clearance mechanism shown in FIGS. 27 and 28 for the middle dials is repeated for the upper dials, a fully detailed description and illustration of the upper dials clearance mechanism is believed unnecessary.

Hook 974 (FIG. 24) is thus held in blocking relation to ear 975 and when the handcrank is turned to rotate gear 554 (FIG. 14) the upper dials will be reset to zero. Near the end of the handcrank cycle, cam 543 (FIG. 24) releases the lower dial clear key in the same manner as described for the lower and middle dial clear keys. The release of the key permits the clutch control lever 782 and the yokes 524 and 547 to return to their initial positions.

Lost Motion Drive

A lost motion drive is provided for the floating add-stop element 303 (FIG. 8) to prevent idle shifting of the element beyond its shifting capacity under the circumstances described below. Element 303 is rendered effective during adding and subtracting operations to control the decimal alignment of the addend or subtrahend with the augend or minuend, respectively. During such operations the floating add-stop is never called upon to shift more than eight orders, and the present machine has been designed to permit only eight orders of shifting movement of element 303.

In multiplication or division operations the floating add-stop element is disabled and does not exert any control over the decimal mechanisms; however, there are certain mathematical problems which the machine may be called upon to perform which would cause the floating add-stop to idly shift more than eight orders if means were not provided to prevent it. For example, assume that a number having eight whole digits such as 46102397. is multiplied by another eight digit number such as 72461359. During the course of the eight order multiplying operation, the shift key 315 will be depressed seven times thus shifting the middle decimal indicator 312 (FIG. 1) and the upper decimal indicator 302 seven orders to the right from their initial leftmost positions.

Now assuming that another multiplying operation is to be carried out and the product thereof is to be accumulated with the first product. In this case, the lower and upper dial clear keys 330 and 332 are depressed and the handcrank is rotated once. This resets the upper dials and the lower dials to zero registrations, unlocks the upper and lower decimal tapes, locks the middle decimal tape to the framework of the machine, and restores the set-up and storing carriages to their original leftmost positions. The leftward return movement of the set-up carriage causes the same to pick up the lower decimal tape and return it seven orders to its original leftmost position. Since the middle decimal tape is locked at this time, the seven order movement of the lower decimal tape imparts a seven order rightward movement to the upper decimal tape. This seven order rightward movement of the upper decimal tape is in addition to the previously mentioned seven order rightward movement of this tape, thus causing a total of fourteen orders of movement of this tape from its original leftmost position. The upper decimal indicating tape 456 (FIG. 8) is capable of partaking of this movement since it merely rotates around the idler pulleys as previously described, but the upper decimal control tape 461 which carries the floating add-stop element 303 cannot be shifted for more than eight orders to the right without rotating the element 303 around the pulley 752. The following means are therefore provided to create a lost motion connection between the upper decimal indicating tape and the upper decimal control tape to prevent movement of the latter when its leftward shifting capacity is exceeded.

It will be recalled that sprocket 460 and gear 995 (FIG. 9) are integral with the sprocket 455. Sprocket 460 drives the upper decimal indicating tape 456, and gear 995 is the input gear of a lost motion mechanism including a gear 996 (FIG. 12) which is driven by gear 995.

Gear 996 is mounted for rotation on a vertical shaft 997, and a drive member 998 is fixed to the bottom side of gear 996. The drive member 998 includes a pair of opposed driving faces 999 and 1000, and a roller 1001 normally stands between the driving faces 999 and 1000. The roller is mounted on one end of a short link 1002, and the other end of the link is pivotally mounted at 1003 to a gear 1004 which is identical to gear 996 and co-axial therewith. Gear 1004 meshes with a gear 1005 which is integral with the gear 752 (FIG. 9), the latter driving the control tape 461.

It will be observed that as long as roller 1001 (FIG. 12) is located between the opposed faces 999 and 1000, the rotation of gear 996 and its integral member 998 in either direction, is directly transmitted to roller 1001, link 1002 and gear 1004; therefore, the control tape 461 will be advanced step-by-step with the upper decimal display tape 456; however, as the control tape approaches either end of its limit of travel, the following mechanism is provided to move roller 1001 from between the driving faces 999 and 1000 so that the gear 996 may continue to rotate without imparting motion to gear 1004 and the control tape.

For this purpose, the roller 1001 extends upwardly through a slot 1006 in a fixed frame 1007 with the upper end of the roller standing between the drive faces 999 and 1000. The major portion of the slot 1006 is concentric with respect to shaft 997, but the two terminal ends of the slot diverge in opposite directions. Thus, the slot 1006 holds roller 1001 between the driving faces 999 and 1000 for the major portion of a single rotation of gear 996; however, if gear 996 is rotated counterclockwise from the position shown in FIG. 12 the slot 1006 will guide the roller in a path which moves the roller inwardly and out of the path of the driving face 999, thus permitting rotation of gear 996 and face 999 without imparting further rotation to gear 1004.

Assume now that the roller 1001 lies in the extreme counterclockwise end of slot 1006 and that gear 996 is rotated in a clockwise direction. During such rotation the rightmost end of the driving face 1000 picks up roller 1001 and cams the same in a clockwise direction about the pivot 1003 thus returning the roller to the circumferential portion of slot 1006. This reestablishes the drive connection between gears 996 and 1004 and, during continued rotation of gear 996, the roller is moved clockwise with the gear 996 until the extreme clockwise end of slot 1006 is approached. At such time, the roller moves outwardly from the path of the driving face 1000, and continued rotation of gear 996 does not impart further rotation to gear 1004.

Upon reversal, i.e., rotation of gear 996 in a counterclockwise direction, the extended portion of driving face 999 picks up roller 1001 and returns it to the circumferential slot 1006 to reestablish the driving connection between gear 996 and gear 1004. The arrangement is such that gear 1004 and the upper decimal control tape 480 are driven in either direction only to the extent necessary for correct operation of the floating add-stop in controlling decimal alignment in problems of addition and subtraction. During multiplication and division operations where certain problems would make it possible to overdrive the floating add-stop, and in which problems the floating add-stop is not enabled to exercise any control, the above-described lost motion mechanism prevents such overdriving.

In the present machine the capacity of the counter register has been effectively increased by means of the decimal control mechanism in that extra holes 511 are provided both to the right and left of the counter register numeral wheels. For example, assume that the machine is in the initial cleared condition shown in FIG. 1 and that the reciprocal of the value 2500. is to be obtained. The operator first depresses the multiply-divide conditioning key 307 and enters the value "1" into the keyboard. This shifts the M.D.D. 312 and the L.D. 322 one order to the right, the U.D.D. 302 remaining locked in the position shown. Then the decimal key 230 is depressed and the handcrank 333 is rotated once to enter the value "1" into the middle dials 234. Thereafter the lower dial clear key 330 is depressed and the handcrank is rotated once to clear the lower dials 184, during which the L.D. 322 is shifted back to its initial position and since M.D.D. 312 is locked by the previous decimal key depression, the U.D.D. 302 is moved one order to the right from the position shown.

Next the divisor value of 2500. is entered into the keyboard. This moves the L.D. 322 four orders to the right and the U.D.D. 302 four orders to the left, for a net resultant leftward movement of the U.D.D. three orders from its initial position. The division operation is now carried out in the previously described manner with the quotient value appearing as .--04; the two dashes represent blank spaces where there are no dials and zeros are correctly assumed, the value thus reading .0004. In the present example, the entire capacity of the counter register was not utilized but would be if a longer fractional quotient were generated such as in obtaining the reciprocal of the value 2505. In the latter case the quotient would appear as .--399201596, and obviously the capacity of the quotient register was increased by two digits.

The following example is given to show how the capacity of the counter register is effectively increased when a value accumulated by a series of positive and negative multiplications is divided by a fractional divisor. Assume that the machine has been performing a series of positive and negative multiplication operations and that the value "742160." stands in the accumulator register with the decimal point locked in the fifth rightmost display position. Also assume that this value is to be divided by a value of "0.00005." According to the rules of operation previously explained, the U.D.D. 302 will be located at the second rightmost position at the time the decimal value "0.00005" is entered into the factor indicator dials 184. The depression of the decimal key 230 prior to depression of the value entry keys locks the U.D.D. 302 in its second rightmost position. The division operation is then carried out and the quotient value of "14843200----." is displayed in the quotient register with the dashes (----) representing three zeros where there are no dials.

In each of the foregoing examples the effective length of the quotient register has been extended through the use of what may be termed "off-board" decimal indicators.

The present invention has been disclosed as being embodied in a ten key calculating machine in which the numeral wheel actuators for the accumulator comprise a plurality of clutches each of which is permanently associated with a respective numeral wheel, and which clutches are engaged and disengaged under the control of a shiftable pin carriage; however, it will be apparent to those skilled in the art that the form of numeral wheel actuators which is chosen for purposes of illustration could as well be one in which the numeral wheel actuators are shiftable as a unit relative to the accumulator register. In such a case the depression of the value entry keys adjusts the individual actuators in accordance with the values selected and upon operation of the main actuator drive shaft the adjusted actuators enter the selected values into aligned orders of the accumulator register in known manner. Therefore, in the claims, the term "numeral wheel actuators," or equivalent connotation, is conveniently and appropriately used in describing the shafting movement of the pin carriage in spite of the fact that in the instant embodiment disclosed, the actuator clutches in themselves are not shiftable.

It will further be noted that, for convenience the invention has been disclosed as embodied in a crank driven calculating machine; however, it is well known that a crank driven calculator is readily converted to a motor driven calculator through the use of an appropriate motor, a motor driven shaft, and clutches selectively driven by the shaft to cause the various described functions to be carried out at the will of the operator.

The invention claimed is:

1. In a calculating machine having a plural order numeral wheel register and an actuating mechanism therefor, a value entry mechanism operable to adjust the actuating mechanism in accordance with a selected value, and means for tabulating the actuating mechanism relative to the numeral wheels; the combination of a decimal indicator for the numeral wheels, means normally operable in response to depression of the value entry keys to move the decimal indicator one order to the right for each ordinal value entered into the actuating mechanism, a decimal key, means operable upon depression of said key to lock the decimal indicator to the actuating mechanism, a means for initiating the operation of the tabulating means a normally enabled connection between the decimal key and said tabulating initiating means, tabulation terminating means comprising a device standing in a pre-determined order relative to the numeral wheels and operable jointly with the decimal indicator to terminate the operation of the tabulating means, selectively settable means effective in a first position to condition the actuating mechanism for non-repeat operation and effective in a second position to condition the actuating mechanism for repeat operation, and means responsive to movement of said settable means to its repeat conditioning position to disable the connection between the decimal key and the tabulation initiating means.

2. A calculating machine as defined in claim 1 and including means for locking the decimal indicator in its current position relative to the actuating mechanism; and means operable to initiate the operation of the decimal indicator locking means and to shift the actuating mechanism one order relative to the numeral wheel register.

3. A calculating machine as defined in claim 1 having a cyclically operable drive mechanism for the actuating mechanism, means operable by the drive mechanism under the control of the selectively settable means in its non-repeat position to return the actuating mechanism to an initial zeroized condition and also operable to move the terminating device to a disabled position.

4. In a calculating machine including a framework and ordinally arranged numeral wheels rotatably mounted upon supporting means fixed within the framework, actuating means for controlling the advance of the numeral wheels, a value entering means including a keyboard and a device operable by the keyboard to adjust the actuating means in accordance with a selected value, means for shifting the entry device one order for each ordinal adjustment of the actuating means, and mechanism for tabulating the actuating means relative to the numeral wheels; the combination of a shiftable radix indicator for the numeral wheel register; means responsive to ordinal movement of the value entry device to cause the radix indicator to shift one order relative to the numeral wheels for each ordinal adjustment of the actuating means; a normally inactive tabulation terminating device; a normally disabled means which is settable to a position in which it locks the radix indicator to the actuating means; a control key; and means responsive to the depression thereof, to enable the locking means, to render the terminating device active, and to initiate the operation of the tabulating mechanism.

5. A calculating machine as defined in claim 4 including selectively operable enabling and disabling means between the control key and both the terminating device and the tabulation initiating means; a second control key and means responsive to depression thereof to disable the first key with respect to the terminating device and the tabulation initiating means.

6. A calculating machine as defined in claim 4 including a cyclically operable drive means for the actuating means, a mechanism operable by a portion of the drive means to reset the actuating means to its initial condition and also to reset the tabulation terminating device to its inactive position.

7. A calculating machine having a numeral wheel register and a fixed decimal stop in said register, a numeral wheel actuating mechanism, means for adjusting the actuating mechanism in accordance with a selected value and for establishing the decimal point in said value, means for tabulating the actuating mechanism to a position in which the value standing therein is in a position of alignment with the decimal stop in said register, cyclically operable means for causing the actuating mechanism to enter the selected value into the numeral wheel register, a mechanism for restoring the actuating mechanism to its initial position and for readjusting the actuating mechanism to its initial cleared condition; means for entering a second value in said register in correct decimal relationship to said first value, comprising: a normally inactive tabulation stop initially located in a position corresponding to the initial position of the actuating mechanism, means responsive to the tabulating means and the restoring mechanism for moving the tabulation stop from its initial position by a number of orders corresponding to the number of orders in the actuating mechanism, and means operable by the adjusting means during the entry of a second value in the actuating mechanism to return the tabulation stop towards its initial position by a number of orders corresponding to the integral digits entered into the actuating mechanism.

8. A calculating machine as defined in claim 7, including a manually operable means for rendering the tabulation stop active and for initiating the operation of the tabulating means.

9. A calculating machine having a numeral wheel register and digital actuators therefor mounted for shifting movement relative to the numeral wheels, value entry means including a shiftable device for adjusting the digital actuators in accordance with a selected value, means for returning said device to its initial position relative to the actuators, a decimal indicator for showing the location of the decimal point in the selected value, means for tabulating the actuators relative to the numeral wheels, a first device for terminating the operation of the tabulating means thus establishing the point of entry of a first value in the numeral wheel register and the location of the decimal position in said register, a second tabulation terminating device, and means operable under the joint control of the tabulating means and the returning means to position the second terminating device relative to the numeral wheels.

10. In a calculating machine having an accumulator register comprising a plurality of ordinally arranged numeral wheels, a decimal indicator mounted for shifting movement relative to the numeral wheels, a plurality of ordinally arranged actuators mounted in a carriage for shifting movement relative to the numeral wheels, a value entry mechanism comprising a keyboard and a value entry device for adjusting the actuators in accordance with a selected value, means for shifting the value entry device one order for each ordinal adjustment of the actuators, a mechanism for tabulating the actuator carriage relative to the numeral wheels, and a key for initiating the operation of the tabulating mechanism; the combination of, means for controlling the shifting movement of the decimal indicator comprising a differential gearing having three legs, the first of which drives a shift means for the decimal indicator, a normally enabled device which locks a second leg of the differential gearing, and means for causing the value entry device to move the third leg and consequently the first leg one ordinal increment for each ordinal entry made in the actuators, means responsive to depression of said tabulation initiating key to lock the third leg of the differential gearing, to unlock the second leg, and to connect the first leg of the differential gearing to the actuator carriage for movement therewith during tabulation of the actuator carriage, a control key and means responsive to depression thereof to disable the initiating key with respect to the tabulating mechanism, and a third key for causing a single order shift of the actuator carriage relative to the numeral wheels whereby the decimal indicator is shifted one order with the actuator carriage.

11. A calculating machine as defined in claim 10 including a counter register and a decimal indicator therefor, and means operable by the second leg of the differential for moving the counter decimal indicator relative to the counter register.

12. A calculating machine as defined in claim 10 including a counter register and a decimal indicator therefor, means operable by the second leg of the differential for moving the counter decimal indicator relative to the counter register, a second single order shift initiating key and means responsive to depression thereof to lock the first leg of the differential prior to initiating a single order shift, thereby locking both decimal indicators in their respective current positions.

13. A calculating machine having a product register comprising a plurality of numeral wheels, actuating mechanism for the numeral wheels, a counter register comprising a plurality of ordinally arranged numeral wheels, a counter register decimal indicator, a shiftable carrier therefor, and an actuator for the counter numeral wheels, means for tabulating the actuating mechanism from an initial position to another position relative to the product register numeral wheels, a tabulation control element normally connected to said counter decimal carrier for shifting movement therewith, means for moving the tabulation control element and the counter decimal carrier with the actuating mechanism during the tabulating movement of the actuating mechanism, means for returning the actuating mechanism to said initial position, means responsive to said returning means for moving the tabulating control element and the counter decimal carrier further in the direction of said prior tabulating movement, and means for disconnecting the tabulation control element from the counter decimal carrier comprising a lost motion connection between said carrier and the tabulation control element, whereby the tabualting control element remains in a predetermined ordinal position relative to the counter register while the counter decimal carrier is permitted to move beyond said predetermined ordinal postiion of the counter register.

14. In a calculating machine having a register comprising a plurality of ordinally arranged numeral wheels and a shiftable decimal indicator therefor, a mechanism for shifting the decimal indicator through a number of orders which exceeds the number of ordinal numeral wheels, a control means normally enabled for movement with the decimal indicator through a limited number of orders, and a lost motion device between the decimal indicator and the control means comprising a first member freely mounted for rotation and driven by the decimal indicator, a second member having driving relationship with the control means and mounted coaxially with the first member, a fixed plate located between the two members and having a main slot cut therein, the opposite ends of which slot diverge in opposite directions from the main slot, a link pivotally mounted upon the second member, a pin carried at the free end of the link and projecting through the slot into an open and raceway guide fixed to the first member, the guide comprising two camming walls forming camming angles relative to the main slot, one of which walls extends beyond one side of the slot and the other of which walls extends beyond the opposite side of the slot whereby the movement of the first member in either one of two directions causes a respective wall to drive the pin and the second member until the pin is driven into a respective diverging slot and out of the path of the wall to thereby permit continued movement of the first member in the absence of movement of the second member.

15. A lost motion device as defined in claim 14 in which movement of the first member in the opposite one of said two directions causes the opposite wall to pick up the pin and return it to the main slot thus re-establishing a drive connection between the first and second members.

16. A calculating machine including an accumulator numeral wheel register, a counter numeral wheel register, a plurality of actuators mounted in a carriage for shifting movement relative to the accumulator numeral wheels, a shiftable actuator for the counter register, and a value entering mechanism including a keyboard and a value entry device responsive to depression of the keys to enter a selected value in a respective order of the plural order actuator and then to shift one order to the next adjacent order of the plural order actuator carriage, a resetting mechanism for zeroizing the accumulator register, means for restoring the value entry device to its initial position relative to the actuator carriage, a decimal indicator mounted for shifting movement relative to the accumulator register, a decimal indicator mounted for shifting movement relative to the counter register, means responsive to shifting of the value entry device for shifting the accumulator decimal indicator, a normally enabled locking device for holding the counter decimal indicator in an initial position, a control key, means operable by the depression of the control key to disable the locking device for the counter decimal indicator, means responsive to depression of the control key to lock the accumulator decimal indicator to the actuator carriage and to enable the shifting mechanism for tabulation of the carriage and the accumulator decimal indicator to a predetermined position relative to the accumulator register, mechanism responsive to the operation of the tabulating mechanism to move the counter decimal indicator in a first one of two directions by a number of orders corresponding to the number of orders of movement of the accumulator decimal indicator, a second control key, means responsive to depression thereof to lock the accumulator decimal indicator in said pre-determined position, mechanism also responsive to the second control key to initiate the operation of the means for restoring the value entry device to its initial position, and mechanism operable by the restoring means for further moving the counter decimal indicator in said first direction by a number of orders corresponding to the number of orders required for restoring the value entry device to said initial position.

17. A calculating machine as defined in claim 16 including a third control key and means responsive to depression thereof to initiate the operation of the accumulator zeroizing mechanism, to enable a drive connection between the counter decimal indicator and the accumulator decimal indicator, and to return the counter decimal indicator to its initial position thereby returning the accumulator decimal indicator the same number of orders towards its initial position.

18. A calculating machine as defined in claim 16 including a mechanism for restoring the actuator carriage to its initial position; a third control key; and means responsive to depression of the third control key to enable a drive connection between the counter decimal indicator and the accumulator decimal indicator, to initiate the operation of the actuator carriage restore mechanism, and to move the counter decimal indicator and the accumulator decimal indicator toward their initial positions by a number of orders required to restore the counter decimal indicator to its initial position.

19. A calculating machine including a plural order numeral wheel register and an actuating mechanism therefor, a value entry mechanism operable to adjust the actuating mechanism in accordance with a selected value, and means for tabulating the actuating mechanism relative to the numeral wheels; the combination of: a decimal indicator for the numeral wheels, means normally operable in response to each depression of a respective value entry key to move the decimal indicator one order for each ordinal value entered in the actuating mechanism, a normally enabled connection between the decimal key and a means for initiating the operation of the tabulating mechanism, and means settable from a first position to a second position to disable the connection between the decimal key and the tabulation initiating means.

20. In a calculating machine having a register comprising a plurality of ordinally arranged numeral wheels, actuators therefor, means for shifting the actuators at least one order relative to the numeral wheels, and means to initiate the operation of the shift means; the combination of: a decimal indicator for the numeral wheels, means for moving the decimal indicator relative to the numeral wheels, mechanism for locking the decimal indicator relative to the numeral wheels, and means responsive to said initiating means for causing the operation of the decimal indicator locking mechanism.

21. A calculating machine having a register comprising a plurality of ordinally arranged numeral wheels, actuators therefor and means for shifting the actuators at least one order relative to the numeral wheels; the combination of: a decimal indicator for the numeral wheels, means for moving the decimal indicator relative to the numeral wheels, a decimal key for locking the decimal indicator relative to the numeral wheels, a shift key for initiating the operation of the shifting means, and means responsive to depression of the shift key for depressing the decimal key prior to initiating the operation of the shifting means.

22. A calculating machine according to claim 21 including means for returning the actuators to their initial position, and mechanism operable in response to the operation of the returning means for returning the decimal key to its raised position.

23. In a calculating machine having a result register comprising a plurality of ordinally arranged numeral wheels, a decimal indicator mounted for shifting movement relative to the numeral wheels, means for receiving the two factors of a calculation including mechanism for establishing decimal points relative to the two respective factors, mechanism for automatically determining the location of the result decimal point in response to the operation of the factor decimal establishing mechanism including means for displaying the ordinal location of the result decimal point one or more orders beyond an endmost ordinal numeral wheel of the result register 24. A calculating machine as defined in claim 23 including a keyboard for selecting the two factors of a calculation, a decimal key operable during the selection of each factor for determining the position of the decimal point in each respective factor receiving means and means responsive to depression of the decimal key during entry of the second factor for locking the result decimal indicator in said location.

25. In a calculating machine having a register including a plurality of ordinally arranged numeral wheels, actuating mechanism therefor, means for adjusting the actuating mechanism in accordance with a selected value, a decimal indicator for the register, means for moving the decimal indicator and the actuating mechanism from respective initial positions to pre-determined positions relative to the numeral wheels, a cyclically operable drive means for the actuating mechanism, means for returning the actuating mechanism to its initial position, and means operable jointly by the drive means and the returning means for locking the decimal indicator in said pre-determined position.

26. A calculating machine having a numeral wheel register, a numeral wheel actuating mechanism mounted for shifting movement relative to the numeral wheels, a factor indicator, a keyboard for adjusting the actuating mechanism in accordance with a selected value which is displayed in the factor indicator, a decimal indicator mounted for shifting movement relative to the numeral wheels, means responsive to entry of a value in the factor indicator for moving the decimal indicator one order for each ordinal digit entered, a decimal key, means responsive to depression of the decimal key to hold the key in depressed position and for shifting the numeral wheel actuators relative to the numeral wheels, resetting means for the factor indicator dials, and mechanism responsive to the operation of the resetting means for returning the decimal key to its raised position.

References Cited in the file of this patent
UNITED STATES PATENTS

| | | |
|---|---|---|
| 2,204,239 | Swanson | June 11, 1940 |
| 2,261,115 | Hofgaard | Nov. 4, 1941 |
| 2,467,419 | Avery | Apr. 19, 1949 |
| 2,702,159 | Reppert | Feb. 15, 1955 |
| 2,702,668 | Dustin | Feb. 22, 1955 |
| 2,773,646 | Mathi | Dec. 11, 1956 |
| 2,896,846 | Dustin | July 28, 1959 |
| 2,917,232 | Wagemann | Dec. 15, 1959 |

FOREIGN PATENTS

| | | |
|---|---|---|
| 337,862 | Germany | June 9, 1921 |
| 515,777 | Italy | Feb. 16, 1955 |